US009489429B2

(12) United States Patent
Matsumoto

(10) Patent No.: US 9,489,429 B2
(45) Date of Patent: Nov. 8, 2016

(54) COMPUTER SYSTEM, DATA MANAGEMENT METHOD, AND PROGRAM

(75) Inventor: Akihiro Matsumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 14/358,715

(22) PCT Filed: Nov. 16, 2011

(86) PCT No.: PCT/JP2011/076398
§ 371 (c)(1),
(2), (4) Date: May 15, 2014

(87) PCT Pub. No.: WO2013/073020
PCT Pub. Date: May 23, 2013

(65) Prior Publication Data
US 2014/0324905 A1 Oct. 30, 2014

(51) Int. Cl.
*G06F 17/30* (2006.01)
*H04L 29/08* (2006.01)

(52) U.S. Cl.
CPC ... *G06F 17/30545* (2013.01); *G06F 17/30584* (2013.01); *H04L 67/10* (2013.01)

(58) Field of Classification Search
CPC .................... G06F 17/30545; G06F 17/30584
See application file for complete search history.

(56) References Cited

U.S. PATENT DOCUMENTS

| 7,930,720 B2* | 4/2011 | Holladay ............ G06Q 30/0204 705/7.33 |
| 2003/0004975 A1 | 1/2003 | Nakano et al. |
| 2006/0143248 A1* | 6/2006 | Nakano ............. G06F 17/30595 |
| 2006/0265445 A1* | 11/2006 | Gustavson ............. G06F 17/16 708/520 |
| 2007/0087756 A1* | 4/2007 | Hoffberg ............ G06Q 10/0631 455/450 |
| 2008/0037777 A1* | 2/2008 | Ignatius ................ G06F 21/602 380/44 |
| 2008/0059745 A1 | 3/2008 | Tsukada et al. |
| 2009/0254572 A1* | 10/2009 | Redlich ................. G06Q 10/06 |
| 2010/0250497 A1* | 9/2010 | Redlich .................. F41H 13/00 707/661 |
| 2010/0306524 A1* | 12/2010 | Runkis .................. H04L 9/0894 713/150 |
| 2013/0080638 A1* | 3/2013 | Di Benedetto ......... H04L 47/70 709/226 |

FOREIGN PATENT DOCUMENTS

| JP | 06139119 A | 5/1994 |
| JP | 06259478 A | 9/1994 |
| JP | 09146812 A | 6/1997 |
| JP | 2003006021 A | 1/2003 |
| JP | 2008065486 A | 3/2008 |
| JP | 2011118525 A | 6/2011 |

* cited by examiner

*Primary Examiner* — Huawen A Peng
(74) *Attorney, Agent, or Firm* — Volpe and Koenig, P.C.

(57) ABSTRACT

A computer system comprising a plurality of computers coupled through a network, the computer system performing service by using a database constructed by a storage area of each of the plurality of computers, wherein a plurality of pieces of data are located in the plurality of computers constructing the database based on a distributed algorithm for distributing and locating the plurality of pieces of data in the plurality of computers, wherein the computer system comprises: a load information management part to manage load information on a load of each of the plurality of computers constructing the database; an algorithm management part to switch the distributed algorithm of the computer system based on the load information; and a relocation processing part to relocate the plurality of pieces of data stored in each of the plurality of computers based on the switched distributed algorithm.

16 Claims, 25 Drawing Sheets

CONFIGURATION INFORMATION

161

| SERVER ID (1611) | MANAGEMENT RANGE (1612) |
|---|---|
| SERVER A | 101 ~ 220 |
| SERVER B | 221 ~ 340 |
| SERVER C | 341 ~ 460 |
| SERVER D | 0 ~ 100, 461 ~ 512 |
| ⋮ | ⋮ |

*Fig. 4*

SERVER LOAD INFORMATION

162

| SERVER ID (1621) | LOAD INFORMATION (1622) | | |
|---|---|---|---|
| | THROUGHPUT (NUMBER OF ACCESSES PER SECOND) (1625) | MEMORY USAGE (%) (1626) | ... |
| SERVER A | 92 | 63 | ... |
| SERVER B | 41 | 26 | ... |
| SERVER C | 22 | 15 | ... |
| ⋮ | ⋮ | ⋮ | ⋮ |

*Fig. 5*

ALGORITHM SWITCHING HISTORY

| SWITCHING HISTORY | SWITCHING CAUSE |
|---|---|
| DISTRIBUTED ALGORITHM 1 | - |
| DISTRIBUTED ALGORITHM 3 | SERVER A (MEMORY USAGE INCREASES) |
| DISTRIBUTED ALGORITHM 1 | SERVER A (MEMORY USAGE DECREASES) |
| DISTRIBUTED ALGORITHM 2 | SERVER D (ACCESS AMOUNT INCREASES) |
| DISTRIBUTED ALGORITHM 4 | SERVER B (ACCESS AMOUNT INCREASES) |
| ⋮ | ⋮ |

*Fig. 7*

ALGORITHM SWITCHING CONDITION INFORMATION

| DISTRIBUTED ALGORITHM | LOAD INFORMATION | THRESHOLD |
|---|---|---|
| DISTRIBUTED ALGORITHM 1 | - | DEFAULT, LOAD DECREASES |
| DISTRIBUTED ALGORITHM 2 | ACCESS LOG | 80 (NUMBER OF ACCESSES PER SECOND) OR MORE |
| DISTRIBUTED ALGORITHM 3 | MEMORY USAGE LOG | 75 (%) OR MORE |
| ⋮ | ⋮ | ⋮ |

*Fig. 8*

MIGRATION HISTORY

| Key | MIGRATION HISTORY | TIME STAMP | SWITCHING CAUSE |
|---|---|---|---|
| 1 | A ⇒ D | (00:10:08) | MEMORY USAGE OF SERVER A |
| 2 | D ⇒ C ⇒ B | (00:05:12), (00:15:35) | ACCESS AMOUNT OF SERVER D, RESPONSE TIME OF SERVER C |
| 3 | A ⇒ B ⇒ D | (00:08:19), (00:22:10) | MEMORY USAGE OF SERVER A, ACCESS AMOUNT OF SERVER B |
| 4 | D ⇒ A ⇒ ⋯ | (00:10:08), (00:10:08) ⋯ | MEMORY USAGE OF SERVER D, ACCESS AMOUNT OF SERVER A ⋯ |
| ⋯ | ⋯ | ⋯ | ⋯ |

| Key | MIGRATION HISTORY | TIME STAMP | SWITCHING CAUSE |
|---|---|---|---|
| 1 | A ⇒ D | (00:10:08) | MEMORY USAGE OF SERVER A |
| 2 | D ⇒ C ⇒ B | (00:05:12), (00:15:35) | ACCESS AMOUNT OF SERVER D, RESPONSE TIME OF SERVER C |
| 3 | A ⇒ B ⇒ D | (00:08:19), (00:22:10) | MEMORY USAGE OF SERVER A, ACCESS AMOUNT OF SERVER B |
| 4 | D ⇒ A ⇒ ⋯ | (00:10:08), (00:10:08) ⋯ | MEMORY USAGE OF SERVER D, ACCESS AMOUNT OF SERVER A ⋯ |
| ⋯ | ⋯ | ⋯ | ⋯ |

| KEY INPUT |
|---|
| 3 |

CONFIGURATION INFORMATION

| SERVER ID | MANAGEMENT RANGE | | |
| --- | --- | --- | --- |
| | MASTER | SLAVE1 | SLAVE2 |
| SERVER A | 101 ~ 220 | 221 ~ 340 | 341 ~ 460 |
| SERVER B | 221 ~ 340 | 341 ~ 460 | 461 ~ 512, 0 ~ 100 |
| SERVER C | 341 ~ 460 | 461 ~ 512, 0 ~ 100 | 101 ~ 220 |
| SERVER D | 0 ~ 100, 461 ~ 512 | 101 ~ 220 | 221 ~ 340 |
| ⋮ | ⋮ | ⋮ | ⋮ |

*Fig. 22*

ALGORITHM SWITCHING CONDITION INFORMATION 1701　　　　　　　　1702　　　　　　170

| LOAD INFORMATION | THRESHOLD |
|---|---|
| - | DEFAULT, LOAD DECREASE |
| ACCESS LOG | 80 (NUMBER OF ACCESSES PER SECOND) OR MORE |
| MEMORY USAGE LOG | 75 (%) OR MORE |
| ⋮ | ⋮ |

*Fig. 27*

ALGORITHM SWITCHING CONDITION INFORMATION 1801　　　　　　　　1802　　　　　　180

| ID | DISTRIBUTED ALGORITHM |
|---|---|
| 1 | DISTRIBUTED ALGORITHM 1 |
| 2 | DISTRIBUTED ALGORITHM 2 |
| 3 | DISTRIBUTED ALGORITHM 3 |
| ⋮ | ⋮ |

*Fig. 28*

COMPUTER SYSTEM, DATA MANAGEMENT METHOD, AND PROGRAM

BACKGROUND OF THE INVENTION

The present invention relates to a distributed database made up of a plurality of computers, and in particular, relates to a process of distributing and locating data.

In recent years, the volume of data processed in a computing system that executes Web applications has increased dramatically, and various systems that improve the performance of accessing data by distributing data to a plurality of computers are known. For example, in a relational database management system (RDBMS), a method of improving the access performance in an entire system by splitting data into predetermined ranges and locating the split data in a plurality of computers is known.

Moreover, a NoSQL (Not only SQL) database such as KVS (Key Value Store) that locates cache data made up of keys which are data identifiers and data values (values) in a plurality of computer systems according to a predetermined distribution method is known as a system that is used in a cache server or the like.

The KVS employs various configurations such as a configuration of storing data in a volatile storage medium (for example, a memory) capable of accessing data at high speed, a configuration of storing data in a nonvolatile recording medium (for example, solid state disk (SSD), HDD, or the like) having excellent persistent data storage properties, or a combination configuration thereof.

In the combination configuration, the balance between a memory store formed by integrating the memories of a plurality of computers and a disk store made up of a nonvolatile storage medium of at least one computer can be changed in various ways according to various operating policies such as a policy that emphasizes high-speed accessibility or a policy that emphasizes data storage properties.

In the memory store and the disk store, data (values) and data identifiers (keys) are stored as pairs.

Moreover, in the KVS, a plurality of servers forms a cluster, and data is distributed and located in the servers included in the cluster to realize parallel processing. Specifically, data corresponding to a management range (for example, a key range) which is a range of data managed by a server is stored in the respective servers. Each server executes a process as a master of the data included in the management range that the server is in charge of. That is, a server in charge of the data of a management range in which a predetermined key is included reads the data corresponding to the key in response to a read request that includes the predetermined key.

Thus, the KVS can improve the parallel processing performance by scale-out.

In the KVS, a system that employs a configuration in which a server that constitutes a cluster stores copy data of the data managed by another server in order to secure data reliability is known. That is, each server is a master that manages data included in a predetermined management range and is a slave that holds the copy data managed by another server. Due to this, even when a failure occurs in a server, processes can be continuously performed since another server which is a slave uses the copy data held by the server as master data instead of the data managed by the failed server as a master.

Hereinafter, the server which is a master will be referred to as a master server and the server which is a slave will be referred to as a slave server.

As described above, a single point of failure does not exist because the servers that constitute the KVS do not have a special server like a management server. That is, since another server can continue processing even when a certain server fails, the computer system does not stop. Thus, the KVS has failure resistance.

The number of slave servers (that is, the number of servers in which copy data is stored) can be arbitrarily set by the computer system.

Examples of a data location method used in the KVS or the like include a consistent hashing method, a range method, and a list method. The consistent hashing method will be described as a representative example. In the consistent hashing method, first, a hash value of a key is calculated, and the residue of a division of the calculated hash value by the number of servers is calculated. Data is located in a server of which the identification number is identical to the residue.

The system described above is a system for improving the access performance. However, if an access concentrates on specific data, there is a problem in that the load of a computer that manages the specific data increases and the access performance of the entire system decreases. Thus, a method of solving the decrease in the access performance by adding a computer, scale-in or scale-out of the system, or the like is known (for example, see Japanese Patent Application Publication No. H6-259478).

Japanese Patent Application Publication No. H6-259478 discloses a technique of setting a splitting condition of a database according to a use state of computer resources, an access distribution, or the like and relocating data according to the splitting condition.

Moreover, a technique of suppressing a decrease in the access performance by splitting the management range on which the load is concentrated due to addition of a new server to a cluster is known (for example, see Japanese Patent Application Publication No. 2011-118525).

SUMMARY OF THE INVENTION

However, in the techniques disclosed in Japanese Patent Application Publication No. H6-259478 and Japanese Patent Application Publication No. 2011-118525, it is necessary to relocate data according to the splitting condition after the system is temporarily stopped. Moreover, the method disclosed in Japanese Patent Application Publication No. 2011-118525 cannot flexibly cope with a temporary change in the load. This is because it is necessary to perform a process of adding a server to a cluster and relocate data included in the management range after the adding process. Thus, the processing cost increases, and the performance of the entire system decreases. Moreover, when a server is removed from the cluster with a decrease in the load, the processing cost is high and the performance of the entire system decreases.

The present invention has been made in view of the above problems. That is, an object of the present invention is to flexibly cope with the load of a computer system and to manage data without decreasing the access performance.

The present invention can be appreciated by the description which follows in conjunction with the following figures, wherein: a computer system comprising a plurality of computers coupled through a network, the computer system performing service by using a database constructed by a storage area of each of the plurality of computers. Each of the plurality of computers includes a processor, a memory coupled to the processor, and a network interface for communicating with another computer via the network which is coupled to the processor. A plurality of pieces of data are located in the plurality of computers constructing the database based on a distributed algorithm for distributing and locating the plurality of pieces of data in the plurality of computers. The computer system comprises: a load information management part to manage load information on a load of each of the plurality of computers constructing the database; an algorithm management part to switch the distributed algorithm of the computer system based on the load information; and a relocation processing part to relocate the plurality of pieces of data stored in each of the plurality of computers based on the switched distributed algorithm.

According to the present invention, since it is possible to switch a data distribution method according to the load of a system constructing a database, it is possible to distribute the load to the server. Thus, it is possible to maintain the performance of the entire system.

BRIEF DESCRIPTION OF THE DRAWINGS

The present invention can be appreciated by the description which follows in conjunction with the following figures, wherein:

FIG. 4 is a diagram illustrating an example of configuration information in the first embodiment of the present invention, FIG. 5 is a diagram illustrating an example of server load information in the first embodiment of the present invention, FIG. 7 is a diagram illustrating an example of algorithm switching history in the first embodiment of the present invention, FIG. 8 is a diagram illustrating an example of algorithm switching condition information in the first embodiment of the present invention, FIG. 9 is a diagram illustrating an example of migration history in the first embodiment of the present invention, FIG. 20 is a diagram illustrating an example of display of a data migration history in the first embodiment of the present invention, FIG. 22 is a diagram illustrating an example of the configuration information in a third embodiment of the present invention, FIG. 27 is a diagram illustrating an example of algorithm switching condition information in the fourth embodiment of the present invention, FIG. 28 is a diagram illustrating an example of switching candidate information in the fourth embodiment of the present invention.

DETAILED DESCRIPTION OF THE PREFERRED EMBODIMENTS

First, an overview of the present invention will be described.

Figure 1:
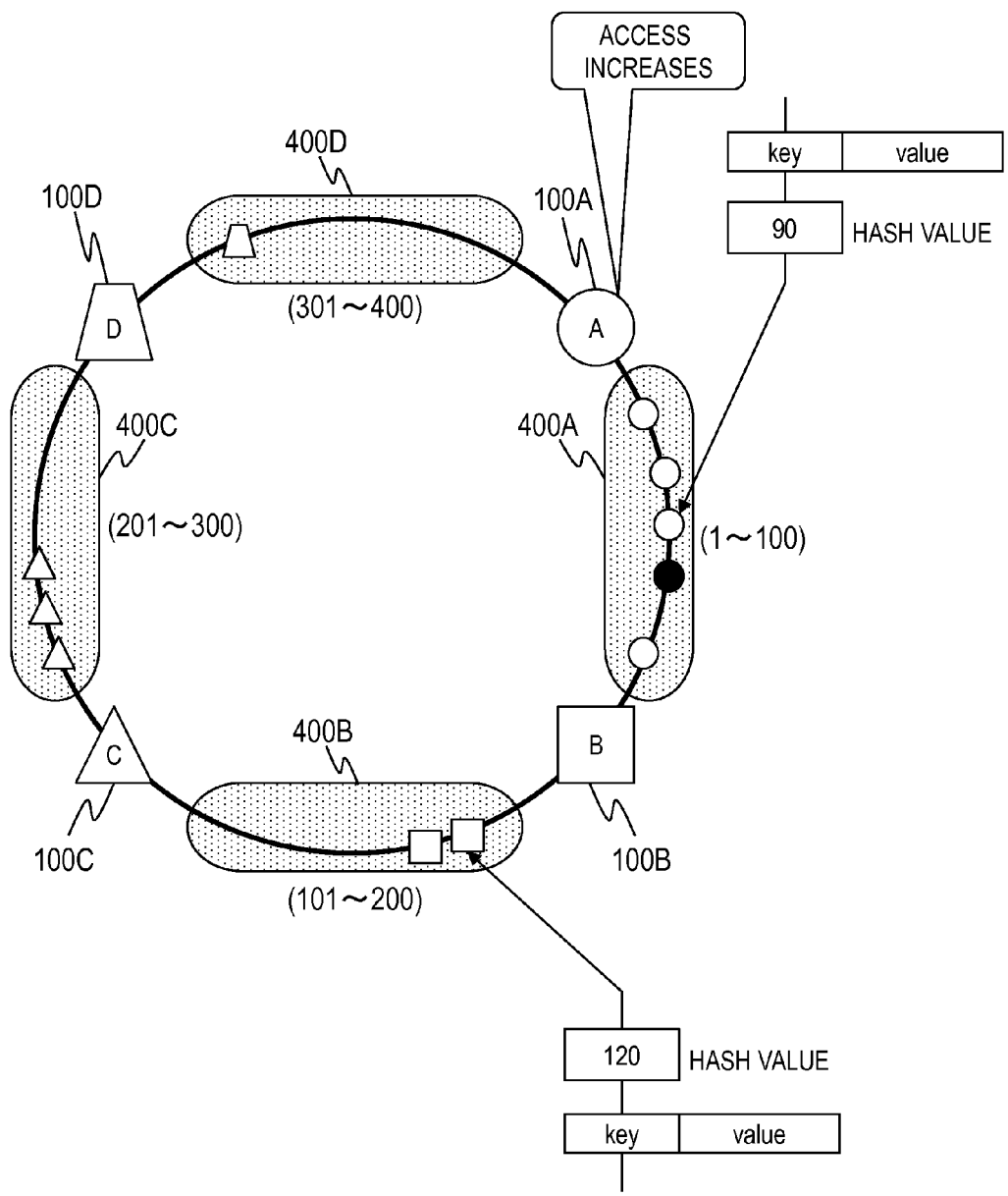
FIG. 1 is a diagram illustrating an overview of the present invention.

FIG. 1 is a diagram illustrating an overview of the present invention.

In a NoSQL database such as a KVS, a consistent hashing method is used as a method of distributing data. In the consistent hashing method, first, the hash value of a plurality of servers 100 is calculated using a predetermined function, and the respective servers 100 are located on a circumference based on the hash value. Moreover, the hash value is calculated from the keys of a plurality of pieces of data and the plurality of pieces of data are located on a circumference based on the hash value. In this case, the respective servers 100 manage the plurality of pieces of data to the right of the circumference.

That is, in the consistent hashing method, in a case where the respective servers 100 are located on the circumference, a management range 400 of the server 100 is determined, and data is distributed to each management range 400.

A data distribution method is not limited to the consistent hashing method, but various methods such as a range method and a list method can be used. In any method, the management range 400 is set for each server 100.

In the example illustrated in FIG. 1, a server 100A manages the data included in a management range 400A, a server 100B manages the data included in a management range 400B, a server 100C manages the data included in a management range 400C, and a server 100D manages the data included in a management range 400D.

Here, the management range 400A is a range of hash values of "1" to "100," the management range 400B is a range of hash values of "101" to "200," the management range 400C is a range of hash values of "201" to "300," and the management range is a range of hash values of "301" to "400."

In a case where the number of accesses to the server 100A increases, the access performance of the server 100A decreases, followed by a decrease in the access performance of the entire system. Thus, it is necessary to distribute the accesses to the server 100A. Thus, in the present invention, the management range 400 managed by the server 100A is changed by switching a distributed algorithm for determining the management range 400. Here, the distributed algorithm is an algorithm for determining the management range 400.

When the distributed algorithm is changed dynamically during operation of a system, since some data managed by the server 100A is located in another server 100, it is possible to distribute the load of the server 100A without stopping the system. Moreover, in the present invention, the processing load of the entire system is suppressed by relocating only necessary data.

In the following description, the consistent hashing method illustrated in FIG. 1 is used as the data distribution and locating method.

[First Embodiment]

Figure 2:
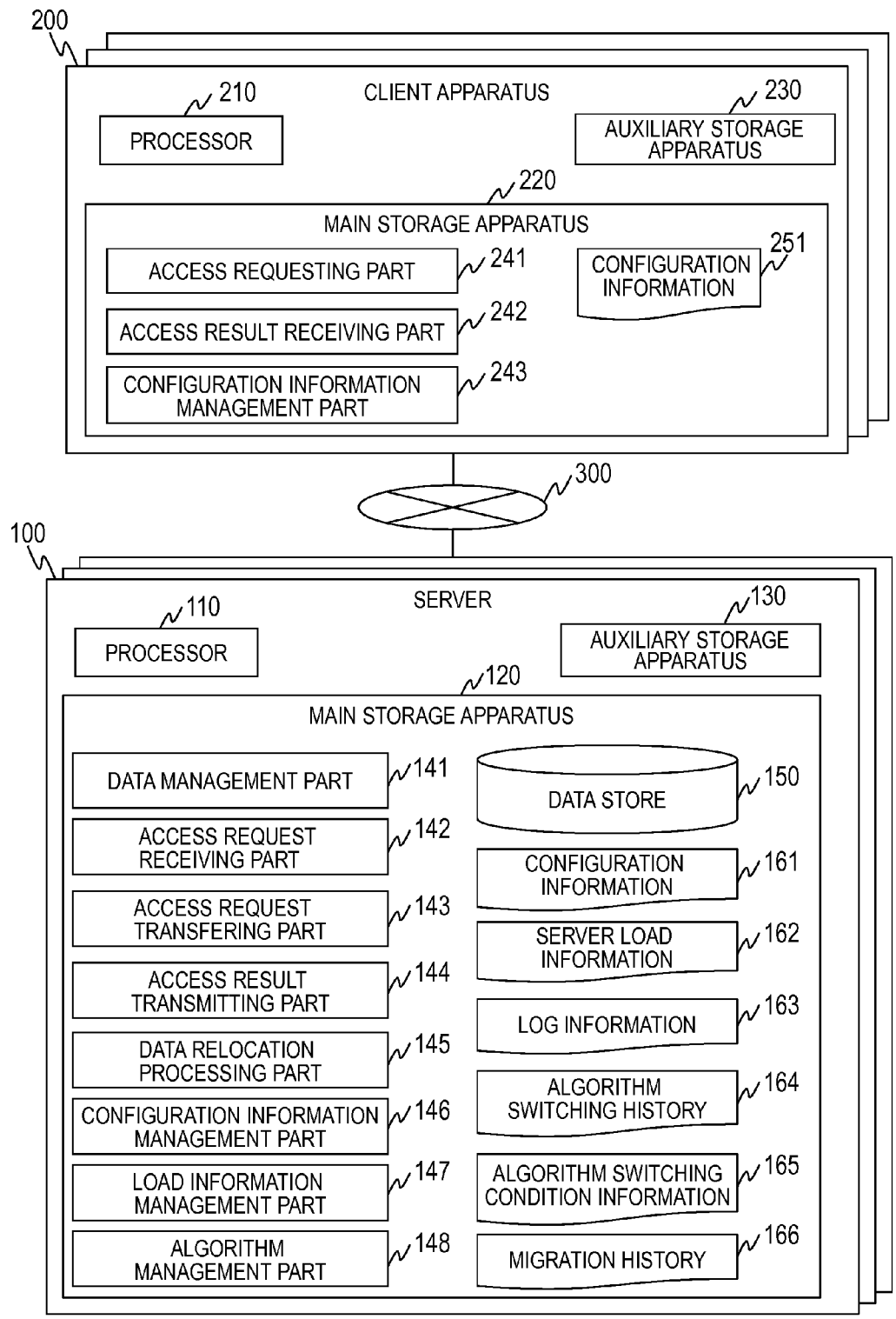
FIG. 2 is a block diagram illustrating a configuration of a computer system according to a first embodiment of the present invention.

FIG. 2 is a block diagram illustrating a configuration of a computer system according to a first embodiment of the present invention.

A computer system includes a plurality of servers 100, a plurality of client apparatuses 200, and a network 300. The respective servers 100 or the server 100 and the client apparatus 200 are connected to each other by the network 300.

The network 300 may employ various cable and wireless configurations such as a LAN, a WAN, or a SAN. In the present invention, the network 300 may be any network if the network enables the server 100 and the client apparatus 200 to communicate with each other. The network 300 includes a plurality of network apparatuses (not illustrated). The network apparatus includes a switch, a gateway, or the like, for example.

In the present embodiment, a plurality of servers 100 forms a cluster, and a NoSQL database is constructed on the storage area included in each of these servers 100. In the present embodiment, it is assumed that a KVS is used as the NoSQL database.

The server 100 includes a processor 110, a main storage apparatus 120, and an auxiliary storage apparatus 130 and is a computer that constitutes the KVS. Moreover, although not illustrated, the server 100 includes a network interface for connecting to a network 300. The server 100 executes various processes according to a request from the client apparatus 200. It is assumed that the respective servers 100 have the same configuration.

The server 100 holds data located in each management range 400 and operates as a master server that manages the data included in the predetermined management range 400. Moreover, the server 100 holds copy of data of the data included in the management range 400 that is managed by another server 100 and operates as a slave server. In the following description, the data managed by the master server will be referred to as master data, and the data managed by the slave server will be referred to as slave data.

Moreover, the cluster of the present embodiment does not have a single server that serves as a management server for managing the entire computer system, and all servers 100 are handled as equal servers. Due to this, in a case where a failure occurs in one server, since another slave server can continue processing as a new master server, it is possible to continue the processing without stopping the computer system.

However, in the first embodiment, it is assumed that each server 100 does not hold the slave data. That is, it is assumed that each server 100 holds the master data only.

The processor 110 executes programs stored in the main storage apparatus 120. By the processor 110 executing programs, the functions of the server 100 can be realized. In the following description, when a program is used as a subject, it means that the program is executed by the processor 110.

The main storage apparatus 120 stores programs executed by the processor 110 and information necessary for execution of the programs. For example, a memory or the like can be used as the main storage apparatus 120.

Programs for realizing a data management part 141, an access request receiving part 142, an access request transmitting part 143, an access result transmitting part 144, a data relocation processing part 145, a configuration information management part 146, a load information management part 147, and an algorithm management part 148 are stored in the main storage apparatus 120 of the present embodiment. Moreover, configuration information 161, server load information 162, log information 163, algorithm switching history 164, algorithm switching condition information 165, and migration history 166 are stored on the main storage apparatus 120 as necessary information.

Further, a data store 150 which is a database that constitutes the KVS is stored on the main storage apparatus 120. A plurality of pieces of data, which are pairs of keys and values, are stored in the data store 150. Data included in the management range 400 is stored in the data store 150 of each server 100.

The auxiliary storage apparatus 130 stores various types of information. For example, a HDD, a SSD, or the like can be used as the auxiliary storage apparatus 130. A disk store (not illustrated) that constructs the KVS may be constructed on the auxiliary storage apparatus 130.

Here, the programs and information stored in the main storage apparatus 120 will be described.

The data management part 141 controls various processes on the data managed by the server 100. The data management part 141 receives a request from the client apparatus 200 and controls processes such as a data read operation or a data write operation based on the request.

The access request receiving part 142 receives an access request from the client apparatus 200 and transmits the received access request to the data management part 141. The access request transmitting part 143 transmits the access request to another server 100 in order to inquire the other server 100 about data. The access result transmitting part 144 transmits the result of the process on the received access request to the client apparatus 200.

The data relocation processing part 145 executes a process of relocating the data stored in the respective management ranges 400 after a distributed algorithm is switched. The configuration information management part 146 manages the configuration information 161 for managing a data storage destination.

The load information management part 147 obtains information on the load of each server 100 and updates the server load information 162 based on the obtained information. The algorithm management part 148 manages the distributed algorithm.

The configuration information 161 stores information indicating storage destination of the data. That is, information indicating the management range 400 of each server 100 is stored in the configuration information 161. Details of the configuration information 161 will be described later with reference to FIG. 4. The server load information 162 stores the information indicating the load of each server 100. Details of the server load information 162 will be described later with reference to FIG. 5. The log information 163 stores various logs of the server 100. Details of the log information 163 will be described later with reference to FIG. 6.

The algorithm switching history 164 stores information on the history of the distributed algorithm that was switched in the past. Details of the algorithm switching history 164 will be described later with reference to FIG. 7. The algorithm switching condition information 165 stores information on the condition for determining whether the distributed algorithm will be switched or not. Details of the algorithm switching condition information 165 will be described later with reference to FIG. 8. The migration history 166 stores the migration history of data between the servers 100. Details of the migration history 166 will be described later with reference to FIG. 9.

Next, the client apparatus 200 will be described. The client apparatus 200 includes a processor 210, a main storage apparatus 220, and an auxiliary storage apparatus 230 and transmits various processing requests to the server 100. Moreover, although not illustrated in the drawing, the client apparatus 200 includes a network interface for connecting to the network 300.

The processor 210 executes programs stored in the main storage apparatus 220. By the processor 210 executing programs, the functions of the client apparatus 200 can be realized. In the following description, when a program is used as a subject, it means that the program is executed by the processor 210.

The main storage apparatus 220 stores programs executed by the processor 210 and information necessary for execution of the programs. For example, a memory or the like can be used as the main storage apparatus 220.

Programs for realizing an access requesting part 241, an access result receiving part 242, and a configuration information management part 243 are stored on the main storage apparatus 220 of the present embodiment. Moreover, configuration information 251 is stored on the main storage apparatus 220 as necessary information.

The auxiliary storage apparatus 230 stores various types of information. For example, a HDD, a SSD, or the like can be used as the auxiliary storage apparatus 130.

Here, the programs and information stored in the main storage apparatus 220 will be described.

The access requesting part 241 transmits an access request to the server 100. The access request is used for requesting execution of a data read operation, a data write operation, and the like. It is assumed that the write operation includes a data write operation and a data overwrite operation.

The access result receiving part 242 receives the result of processes on the access request transmitted from the server 100. The configuration information management part 243 manages the configuration information 251 that manages the data storage destination.

The configuration information 251 stores information indicating the data storage destination.

In the present embodiment, although the functions of the server 100 and the client apparatus 200 are realized using software, the same functions may be realized using dedicated hardware.

Moreover, the computer system may include a management computer that includes the load information management part 147, the algorithm management part 148, and the like separately from the server 100. In this way, the number of configurations of the server 100 can be reduced.

Figure 3:
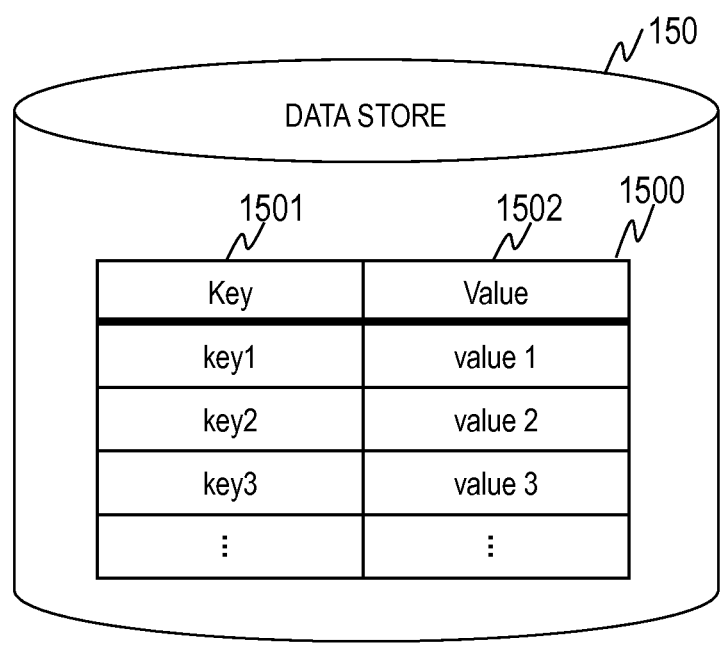
FIG. 3 is a diagram illustrating a type of data stored in a data store in the first embodiment of the present invention.

FIG. 3 is a diagram illustrating the type of data stored in the data store 150 in the first embodiment of the present invention.

In the present embodiment, the data store 150 stores data management information 1500. The data management information 1500 includes a plurality of pieces of data which are pairs keys and values. Hereinafter, data which is pair of key and value will be referred to as key-value-type data.

The data management information 1500 includes a Key 1501 and a Value 1502. The Key 1501 stores identifiers (keys) for identifying data. The Value 1502 stores actual data (values).

The user who operates the client apparatus 200 can store data in the KVS by designating the Key 1501 and obtain desired data from the KVS by designating the Key 1501.

Each server 100 manages the key-value-type data for each range (management range 400) of the Key 1501. That is, a plurality of pieces of the key-value-type data in each management range 400 are distributed and located in each server 100. The server 100 executes processes as a master server of the data of the designated management range 400. In this way, it is possible to process a large amount of data in parallel and at high speed.

FIG. 4 is a diagram illustrating an example of the configuration information 161 in the first embodiment of the present invention.

The configuration information 161 stores information on the management range 400 of each server 100. Specifically, the configuration information 161 includes a server ID 1611 and a management range 1612.

The server ID 1611 stores an identifier for uniquely identifying the server 100. An identifier, an IP address, a MAC address, and the like of the server 100 are stored in the server ID 1611.

The management range 1612 stores a range of values indicating the management range 400. The value of the management range of the master data of each server 100 is stored in the management range 1612. In the present embodiment, a hash value is stored as the value of the management range 400.

FIG. 5 is a diagram illustrating an example of the server load information 162 in the first embodiment of the present invention.

The server load information 162 stores information indicating the load of each server 100. Specifically, the server load information 162 includes a server ID 1621 and load information 1622.

The server ID 1621 stores an identifier for uniquely identifying the server 100. The server ID 1621 is the same as the server ID 1611.

The load information 1622 stores information on the load of the server 100. The load information 1622 of the present embodiment includes a throughput 1625 and a memory usage 1626. Other load information such as a processor operating rate, a capacity of free space of the data store 150, and a network bandwidth consumption rate may be stored in the load information 1622.

The throughput 1625 stores a throughput value indicating the number of requests per unit time. The memory usage 1626 stores the usage rate of a memory.

Figure 6:
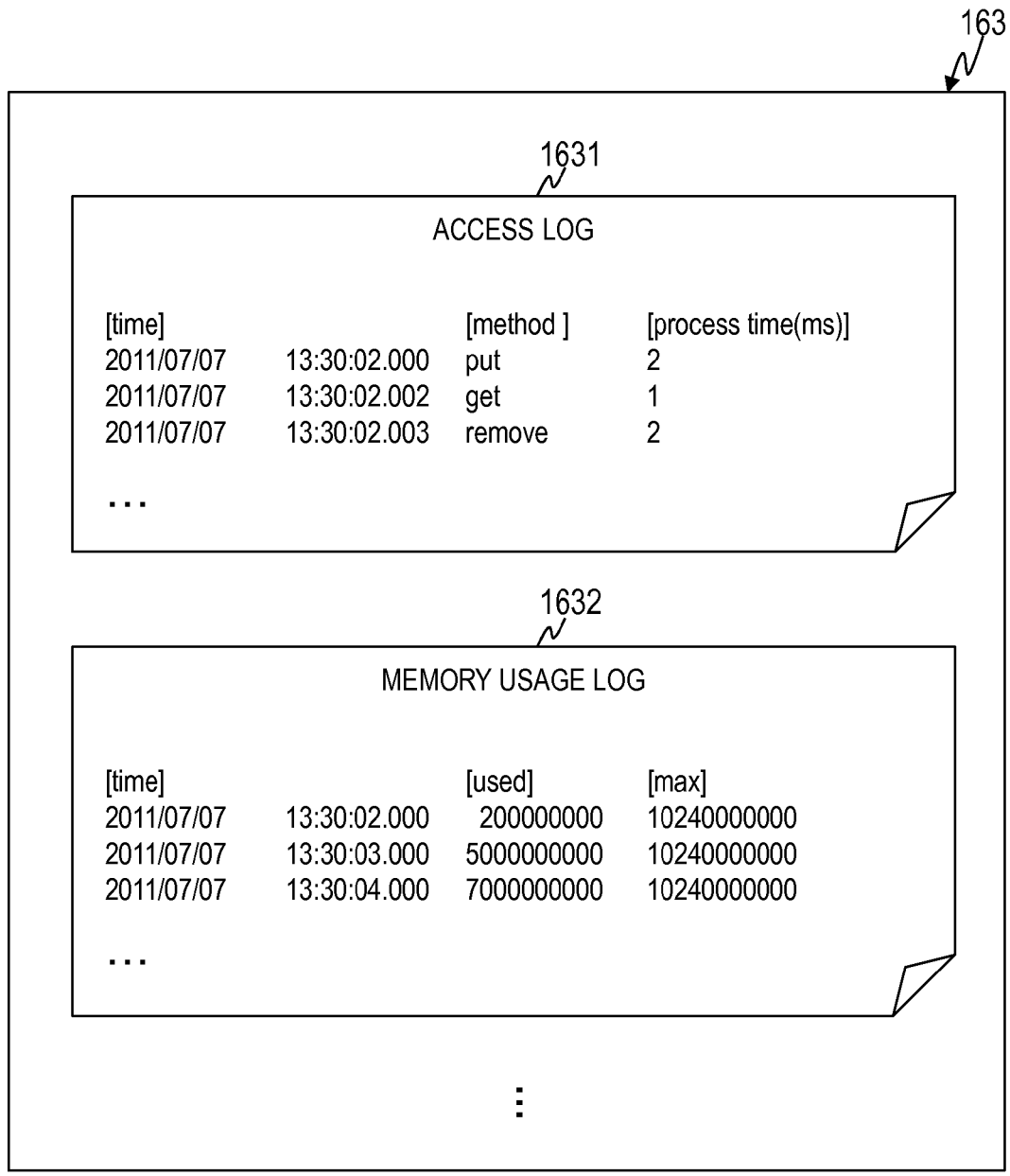
FIG. 6 is a diagram illustrating an example of log information in the first embodiment of the present invention.

FIG. 6 is a diagram illustrating an example of the log information 163 in the first embodiment of the present invention.

The log information 163 stores various logs of the server 100. In the example illustrated in FIG. 6, the log information 163 includes an access log 1631 and a memory usage log 1632.

The access log 1631 stores logs on the access from the client apparatus 200 and other servers 100. The memory usage log 1632 stores logs on the usage of a memory included in the server 100.

Other logs such as a response time, a cache hit ratio, a frequency of use, the number of references to data, and the number of updates of data may be stored in the log information 163.

FIG. 7 is a diagram illustrating an example of the algorithm switching history 164 in the first embodiment of the present invention.

The algorithm switching history 164 stores the history of the distributed algorithm that has been switched up to now. Specifically, the algorithm switching history 164 includes switching history 1641 and switching cause 1642.

The switching history 1641 stores information on a distributed algorithm for determining the management range 400 of each server 100. For example, an identifier, a hash function, and the like of the distributed algorithm are stored in the switching history 1641. The switching cause 1642 stores the cause of why the distributed algorithm is switched.

FIG. 8 is a diagram illustrating an example of the algorithm switching condition information 165 in the first embodiment of the present invention.

The algorithm switching condition information 165 stores a criterion for switching a distributed algorithm. Specifically, the algorithm switching condition information 165 includes a distributed algorithm 1651, load information 1652, and a threshold 1653.

The distributed algorithm 1651 stores information on the distributed algorithm for determining the management range 400 of each server 100. The load information 1652 stores load information serving as a switching criterion. Items corresponding to load information 702 are stored in the load information 1652. The threshold 1653 stores a threshold of the load information stored in the load information 1622.

In the example illustrated in FIG. 8, "Distributed algorithm 1" indicates that it is a distributed algorithm which is used in a case where no load is applied to the server 100 and which is switched in a case where the load decreases. "Distributed algorithm 2" indicates that it is a distributed algorithm which is switched based on the access log 1631 of the server 100 and in which a throughput value is used as the threshold 1653. "Distributed algorithm 3" indicates that it is a distributed algorithm which is switched based on the memory usage log 1632 of the server 100 and a memory usage is used as the threshold 1653.

The distributed algorithm determined based on the load information 1652 such as a throughput log, a response log, a cache hit ratio log, a data reference number log, a data update number log, or a use frequency log for each client may be stored in the algorithm switching condition information 165.

FIG. 9 is a diagram illustrating an example of the migration history 166 in the first embodiment of the present invention.

The migration history 166 stores the history of migration of a piece of data between the servers 100. Specifically, the migration history 166 includes a Key 1661, migration history 1662, a time stamp 1663, and switching cause 1664.

The Key 1661 stores an identifier (key) for identifying a piece of data. The migration history 1662 stores identification information of the server 100 to which a piece of data corresponding to the Key 1661 migrates.

The time stamp 1663 stores the time when data has migrated between the servers 100. One time stamp is stored in the time stamp 1663 whenever data migrates between the servers 100.

The switching cause 1664 stores the cause of why the data store is switched. One switching cause is stored in the switching cause 1664 whenever data migrates between the servers 100.

Next, various processes will be described. First, a process executed when the distributed algorithm is switched will be described.

Figure 10:
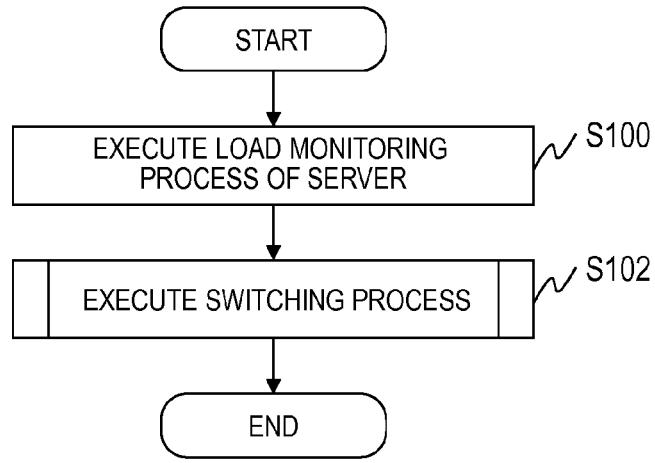
FIG. 10 is a flowchart illustrating an overview of processing executed by a server in the first embodiment of the present invention.

FIG. 10 is a flowchart illustrating an overview of the processing executed by the server 100 in the first embodiment of the present invention.

In the following description, the server 100 that supervises the process among the servers 100 will be referred to as a central server 100. The central server 100 may be set in advance and may be set manually by an administrator of the KVS, and the server 100 that has first received an access request or the like may be set as the central server 100. Moreover, the central server 100 may be changed for each different process. The process executed by the central server 100 is a process that can be executed by any server 100.

The central server 100 executes a process for monitoring the load of each server 100 (step S100). Specifically, the central server 100 obtains the load information from each server 100 periodically or non-periodically to update the server load information 162.

Subsequently, the central server 100 refers to the server load information 162 and the algorithm switching condition information 165 to execute a distributed algorithm switching process (step S102).

The central server 100 may execute the process illustrated in FIG. 10 periodically and may execute the process according to a request from the client apparatus 200. Moreover, in a case where the load of the central server 100 which monitors the load is high, the central server 100 may refer to the server load information 162 to perform control such that the server 100 having low load is changed as the central server 100. In this case, the central server 100 after change executes the switching process.

Figure 11:
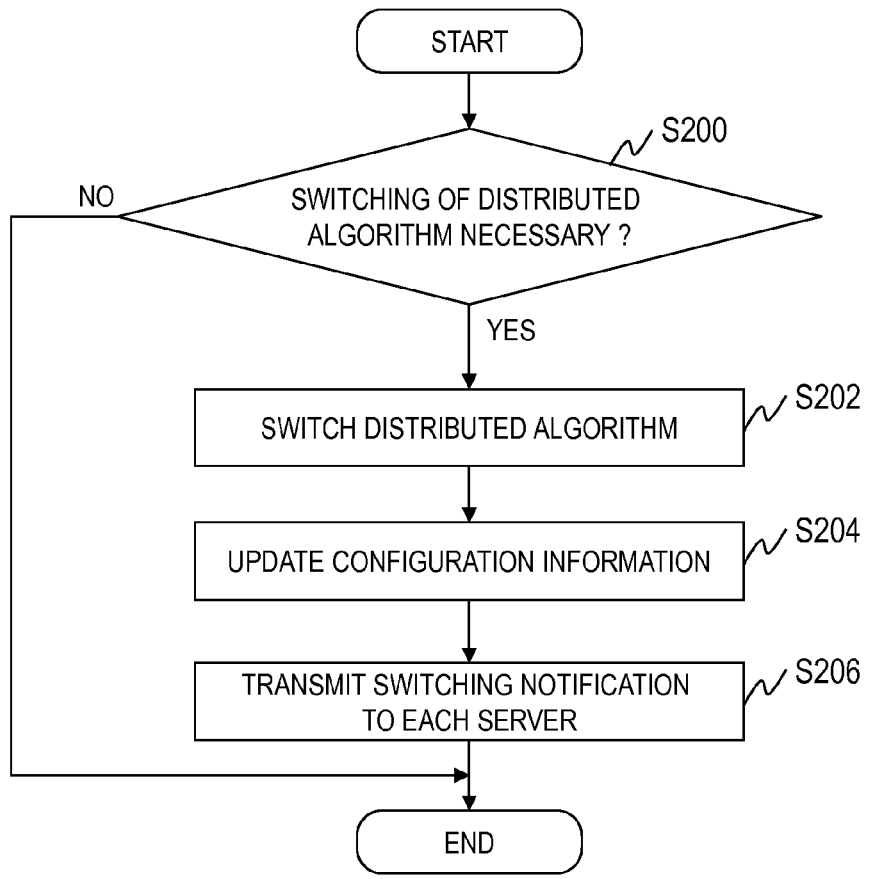
FIG. 11 is a flowchart illustrating details of a distributed algorithm switch processing executed by the server in the first embodiment of the present invention.

FIG. 11 is a flowchart illustrating the details of the distributed algorithm switch processing executed by the server 100 in the first embodiment of the present invention. The distributed algorithm switching process is executed by the algorithm management part 148 of the central server 100.

The algorithm management part 148 refers to the server load information 162 and the algorithm switching condition information 165 to determine whether it is necessary to switch the distributed algorithm (step S200). That is, it is determined whether the load of a specific server 100 has increased or decreased. Specifically, the algorithm management part 148 compares the value in the load information 1622 and the threshold 1653 of the corresponding load information to determine whether a switching condition is satisfied.

In the example illustrated in FIG. 5, in the case of the throughput 1625, since the throughput 1625 of the server 1 is "92" and the corresponding threshold 1653 of the load information is "80," it is determined that the load of the server 100 has increased and it is necessary to switch the distributed algorithm.

In a case where a plurality of switching conditions is satisfied, the distributed algorithm may be switched to a distributed algorithm corresponding to a high-level switching condition, and priority orders of the switching conditions may be set in advance so that the distributed algorithm is switched based on the priority order.

In a case where it is determined that it is necessary to switch the distributed algorithm, the algorithm management part 148 switches the distributed algorithm to a distributed algorithm which matched the switching condition (step S202). Specifically, the distributed algorithm is changed to the distributed algorithm 1651 matched the corresponding switching condition.

The algorithm management part 148 instructs to update the configuration information 161 (step S204). Specifically, the algorithm management part 148 instructs the configuration information management part 146 to update the configuration information 161. The configuration information management part 146 received the instruction updates the configuration information 161 based on the switched distributed algorithm.

In this way, since the management range 400 of each server 100 is changed, it is possible to equalize the loads of the servers 100.

The algorithm management part 148 transmits a switching notification to each server 100 for notifying that the distributed algorithm has been switched, and ends the process (step S206). The switching notification includes information on the switched distributed algorithm and the updated configuration information 161.

Figure 12:
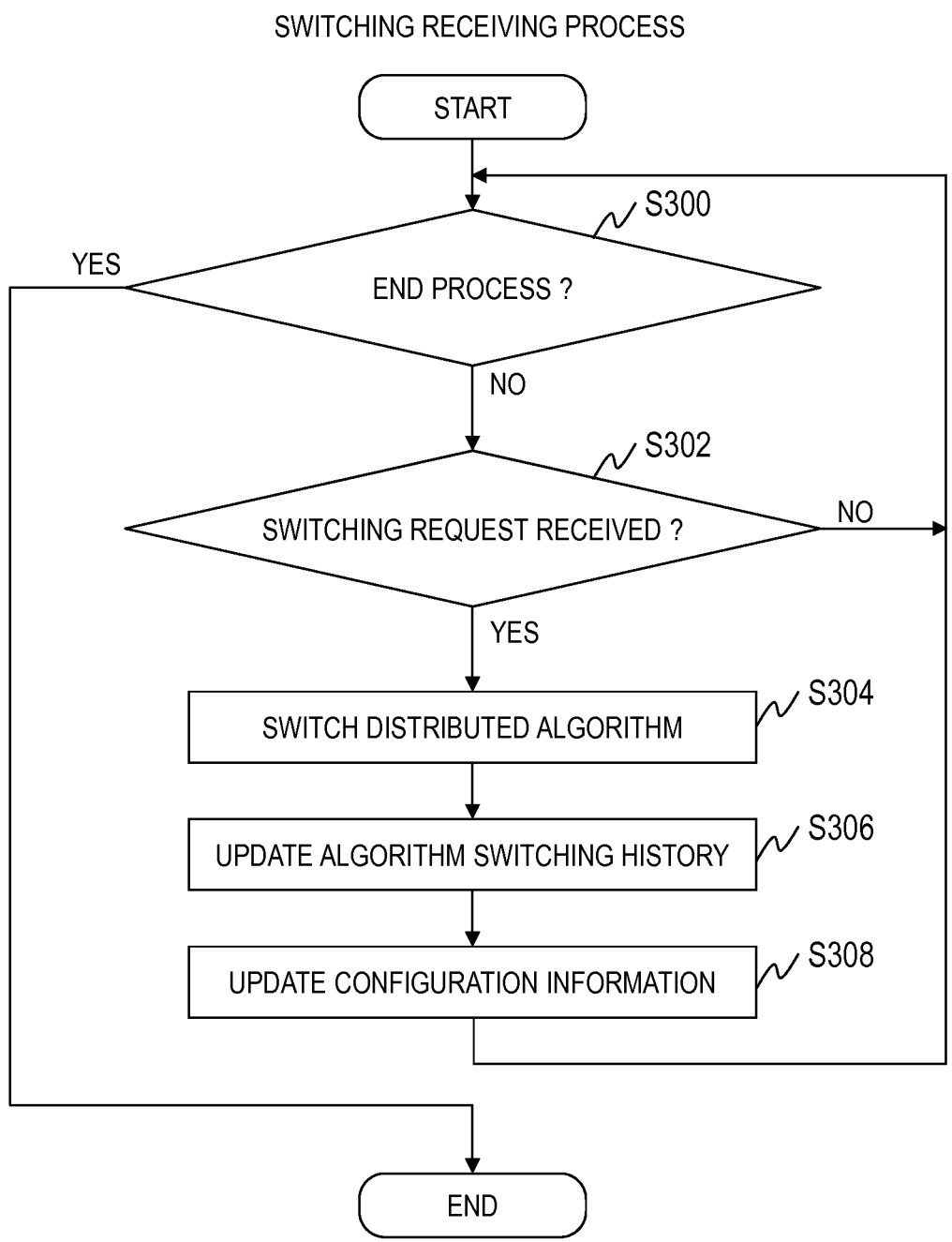
FIG. 12 is a flowchart illustrating a switching receiving process executed by the server in the first embodiment of the present invention.

FIG. 12 is a flowchart illustrating a switching receiving process executed by the server 100 in the first embodiment of the present invention.

It is assumed that the server 100 executes the switching receiving process described below periodically. Moreover, the switching receiving process is executed by the algorithm management part 148 of the server 100.

First, the algorithm management part 148 determines whether the process is to be ended (step S300). For example, it is determined that the process is to be ended, in a case where the server 100 is stopped.

Subsequently, the algorithm management part 148 determines whether a switching notification is received from the central server 100 (step S302). In a case where it is determined that the switching notification is not received from the central server 100, the algorithm management part 148 returns to step S300 and waits until the switching notification is received.

In a case where it is determined that the switching notification is received from the central server 100, the algorithm management part 148 switches the distributed algorithm based on the information on the distributed algorithm included in the switching notification (step S304) and updates the algorithm switching history 164 (step S306).

The algorithm management part 148 instructs to update the configuration information 161 (step S308). Specifically, the algorithm management part 148 instructs the configuration information management part 146 to overwrite the configuration information 161 included in the received switching notification into the configuration information 161 stored presently. The updating method is not limited to the overwriting to the configuration information 161, and a method of discarding the configuration information 161 stored presently and storing the configuration information 161 included in the received switching notification may be used.

After that, the server 100 returns to step S300 and executes the same process (steps S300 to S308).

Next, the process on the access request from the client apparatus 200 will be described.

Figure 13:
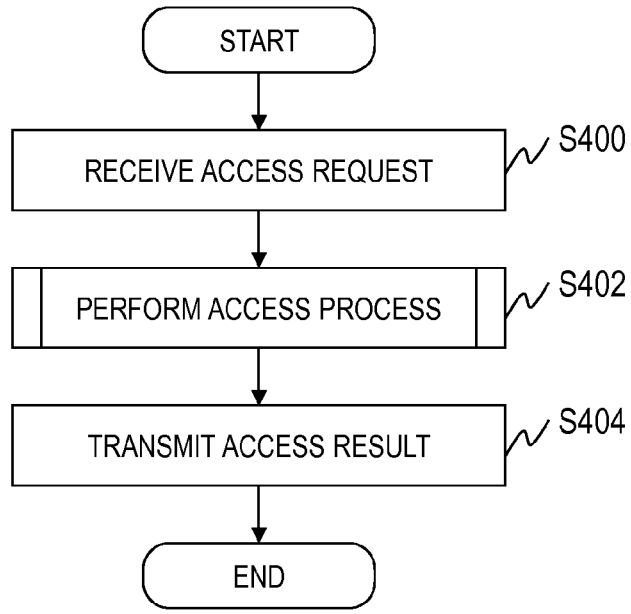
FIG. 13 is a flowchart illustrating an overview of a process executed when the server receives an access request in the first embodiment of the present invention.

FIG. 13 is a flowchart illustrating an overview of the process executed when the server 100 receives an access request in the first embodiment of the present invention.

In a case of receiving an access request from the client apparatus 200 (step S400), the server 100 executes an access process (step S402).

The server 100 obtains a piece of target data of the access request and transmits an access result including the piece of obtained data to the client apparatus which is a transmission source of the access request (step S404). In the following description, the target data of the access request is also referred to as target data.

Figure 14:
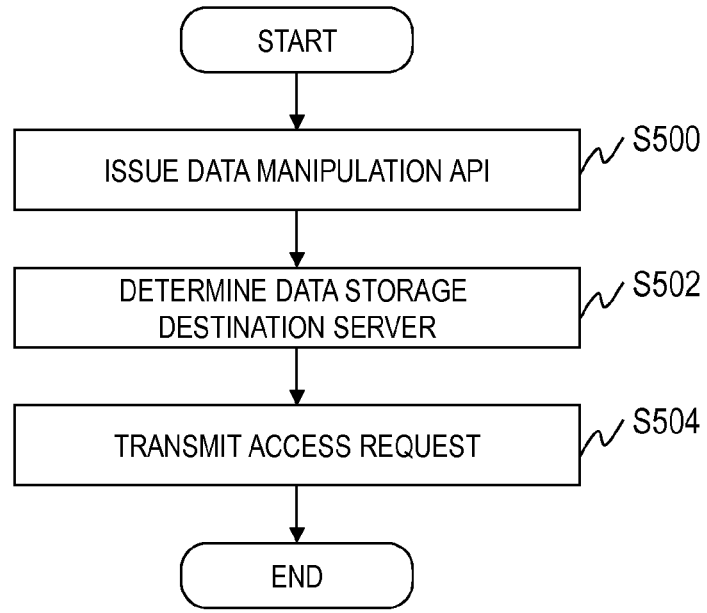
FIG. 14 is a flowchart illustrating an access request issuing process executed by a client apparatus in the first embodiment of the present invention.

FIG. 14 is a flowchart illustrating an access request issuing process executed by the client apparatus 200 in the first embodiment of the present invention. The access request issuing process is executed by the access requesting part 241.

The access requesting part 241 issues a data manipulation API (step S500). The target data is determined based on the issued data manipulation API.

The access requesting part 241 refers to the configuration information 251 to specify the server 100 in which the piece of target data is stored (step S502). In this example, it is assumed that the configuration information 251 is updated to the latest configuration information 251 by a configuration information updating process described later.

In a case where the configuration information 251 is not the latest one, the server 100 received the access request transmits the access request to the server 100 that stores the piece of target data.

The access requesting part 241 transmits the access request including the identification information (key) of the piece of target data to the specified server 100 and ends the process (step S504).

Figure 15:
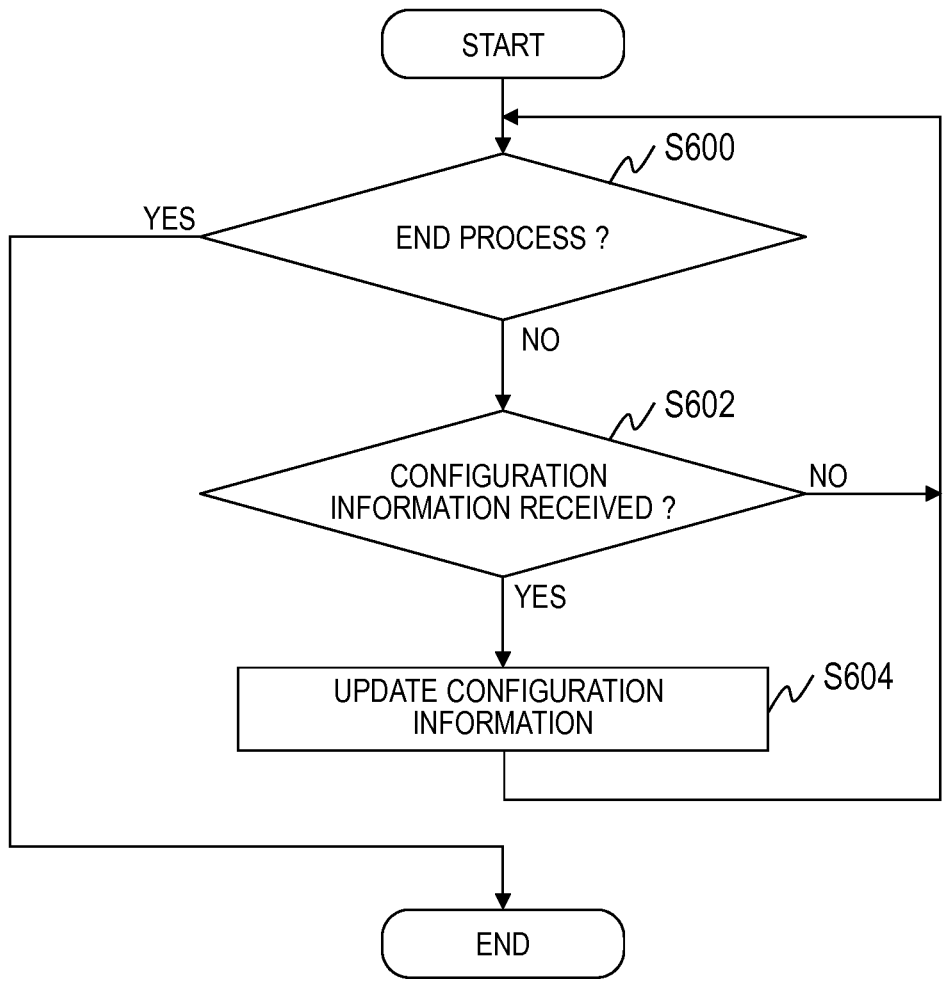
FIG. 15 is a flowchart illustrating a configuration information updating process executed by the client apparatus in the first embodiment of the present invention.

FIG. 15 is a flowchart illustrating the configuration information updating process executed by the client apparatus 200 in the first embodiment of the present invention. The configuration information updating process is executed by the configuration information management part 243. The configuration information management part 243 of the present embodiment executes the process described below periodically. The process may be executed, in a case where the client apparatus 200 receives an access result including new configuration information 161 from the server 100 which is a transmission destination of the access request.

First, the configuration information management part 243 determines whether the process is to be ended (step S600). For example, it is determined that the process is to be ended when the client apparatus 200 is stopped.

Subsequently, the configuration information management part 243 determines whether new configuration information 161 is received from the server 100 (step S602).

In a case where it is determined that new configuration information 161 is not received, the configuration information management part 243 returns to step S600 and waits until the new configuration information 161 is received.

In a case where it is determined that the new configuration information 161 is received, the configuration information management part 243 updates the configuration information 251 by overwriting the new configuration information 161 into the configuration information 251 stored presently (step S604). After that, the configuration information management part 243 returns to step S600 and executes the same process.

Figure 16:
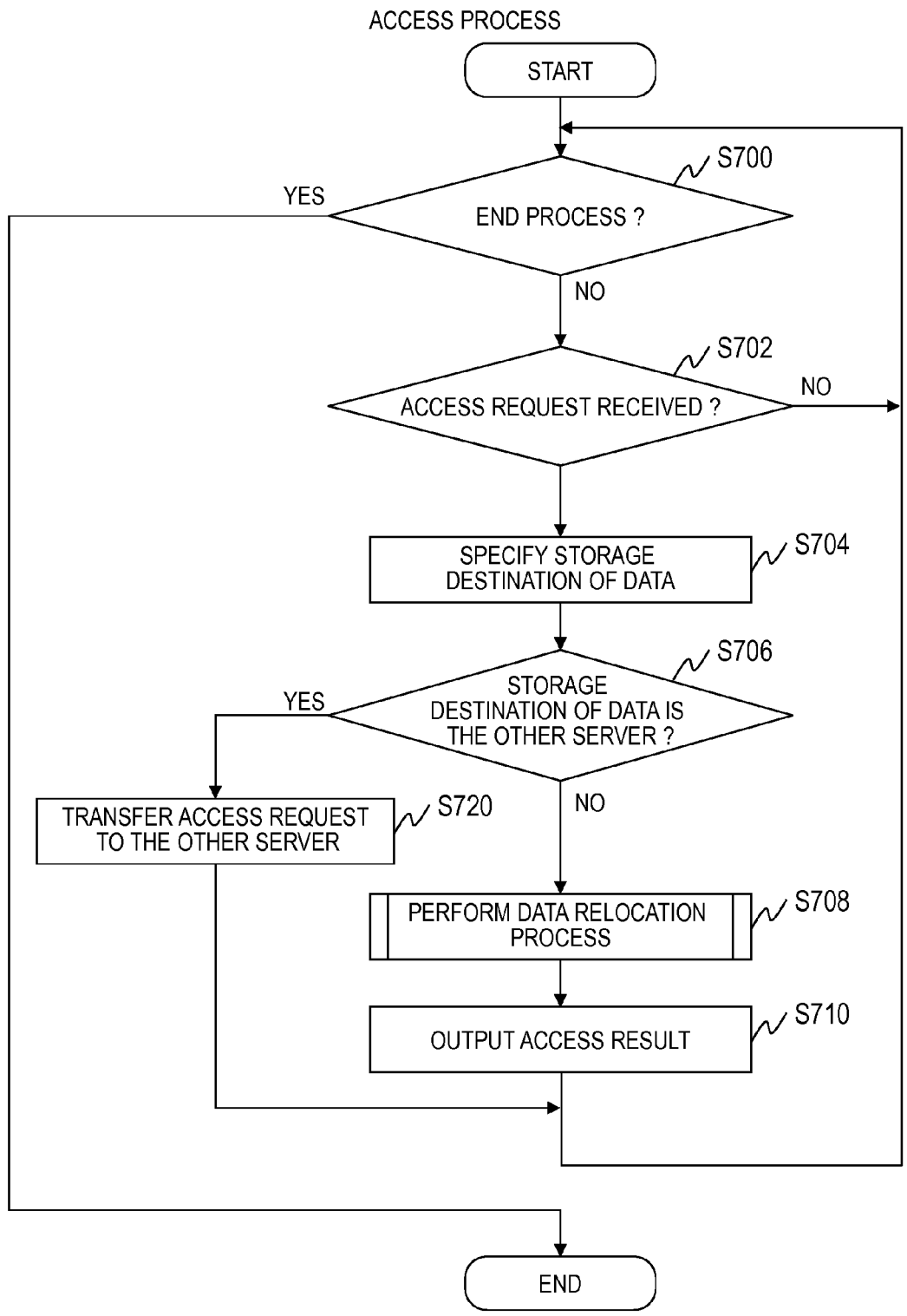
FIG. 16 is a flowchart illustrating an access process executed by the server in the first embodiment of the present invention.

FIG. 16 is a flowchart illustrating the access process executed by the server 100 in the first embodiment of the present invention. The access process is executed by the data management part 141.

First, the data management part 141 determines whether the process is to be ended (step S700). For example, it is determined that the process is to be ended when the server 100 is stopped.

Subsequently, the data management part 141 determines whether an access request is received (step S702). The access request is transmitted from the client apparatus 200 or the other server 100.

In a case where it is determined that the access request is not received, the data management part 141 returns to step S700 and waits until the access request is received.

In a case where it is determined that the access request is received, the data management part 141 specifies a storage destination of a piece of target data (step S704). Specifically, the data management part 141 refers to the configuration information 161 to determine whether the piece of target data is included in the management range 400 of a certain server 100. In the first embodiment, determination is made for the management range 400 described in the master of the management range 1612 only. That is, the master server 100 of the piece of target data is specified.

The data management part 141 determines whether the storage destination of the piece of target data is the other server 100 based on the result of the determination (step S706).

In the example illustrated in FIG. 4, in a case where the server A receives an access request for data of which the hash value is "350," since the data storage destination is the server C, it is determined that the storage destination of the piece of target data is the other server 100.

In a case where it is determined that the storage destination of the piece of target data is not the other server 100, in other words, in a case where it is determined that the storage destination of the piece of target data is the subject server 100, the data management part 141 instructs the data relocation processing part 145 to execute a data relocation process (step S708). The data relocation process will be described later with reference to FIG. 17.

The data management part 141 obtains the piece of target data and instructs the access result transmitting part 144 to transmit an access result including the piece of obtained target data (step S710). The access result transmitting part 144 received the instruction transmits the access result to the client apparatus 200 which is the transmission source of the access request. After that, the data management part 141 returns to step S700 and executes the same process.

In a case where it is determined in step S706 that the storage destination of the piece of target data is the other server 100, the data management part 141 transmits the access request to the other server 100 which stores the target data (step S720). In the other server 100 received the access request, the process illustrated in FIG. 16 is executed. After that, the data management part 141 returns to step S700 and executes the same process.

Figure 17:
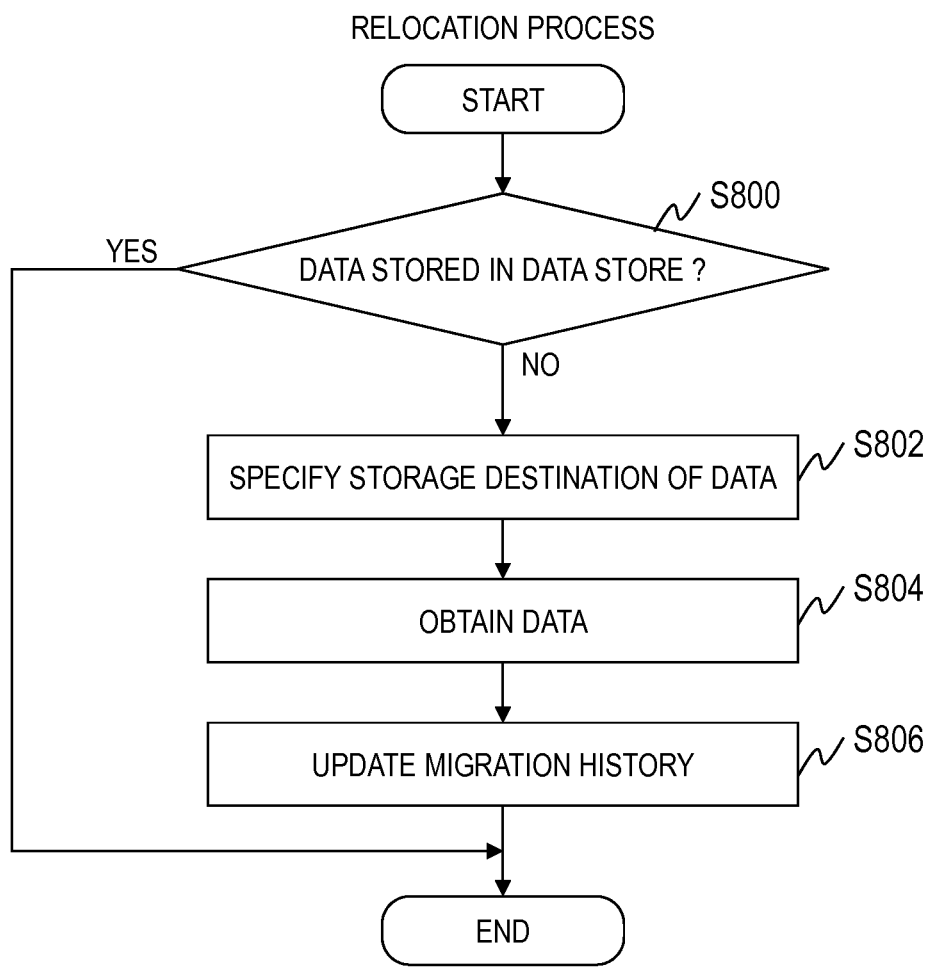
FIG. 17 is a flowchart illustrating a data relocation process executed by the server in the first embodiment of the present invention.

FIG. 17 is a flowchart illustrating the data relocation process executed by the server 100 in the first embodiment of the present invention.

The data relocation processing part 145 determines whether the piece of target data is stored in the data store 150 (step S800).

In a case where it is determined that the piece of target data is stored in the data store 150, the data relocation processing part 145 ends the process because it is not necessary to relocate the target data in the data store 150.

In a case where it is determined that the piece of target data is not stored in the data store 150, the data relocation processing part 145 refers to the algorithm switching history 164 to specify the storage destination of the piece of target data (step S802). Specifically, the following process is executed.

First, the data relocation processing part 145 refers to the algorithm switching history 164 to specify a previous distributed algorithm located immediately before the distributed algorithm used presently. The data relocation processing part 145 calculates the management range 400 of each server 100 from the previous distributed algorithm and specifies the server 100 which has managed the piece of target data.

The data relocation processing part 145 inquires the specified server 100 about the piece of target data. If the inquiry result shows that the specified server 100 has not stored the piece of target data, the data relocation processing part 145 executes the same process using a further previous distributed algorithm. This is the process of step S802.

Subsequently, the data relocation processing part 145 obtains the piece of target data from the specified server 100 (step S804). As an obtaining method, a method of copying the piece of target data stored in the specified server 100, a method of migrating the piece of target data stored in the specified server 100, or other method can be used. Here, copying of data means storing the copy of data of the piece of target data stored in another server 100 in the subject server 100. Moreover, migration of data means storing the piece of target data in the subject server 100 and deleting the piece of target data from the other server 100.

The data relocation processing part 145 executes a process of updating the migration history 166 and ends the process (step S806). Details of the process of updating the migration history 166 will be described later with reference to FIG. 18.

As described above, in the present embodiment, in a case where the distributed algorithm is switched, the relocation process is executed for the piece of data accessed from the client apparatus 200 only. Due to this, it is possible to obviate unnecessary execution of the data relocation process and to suppress an increase in the load of the server 100.

Figure 18:
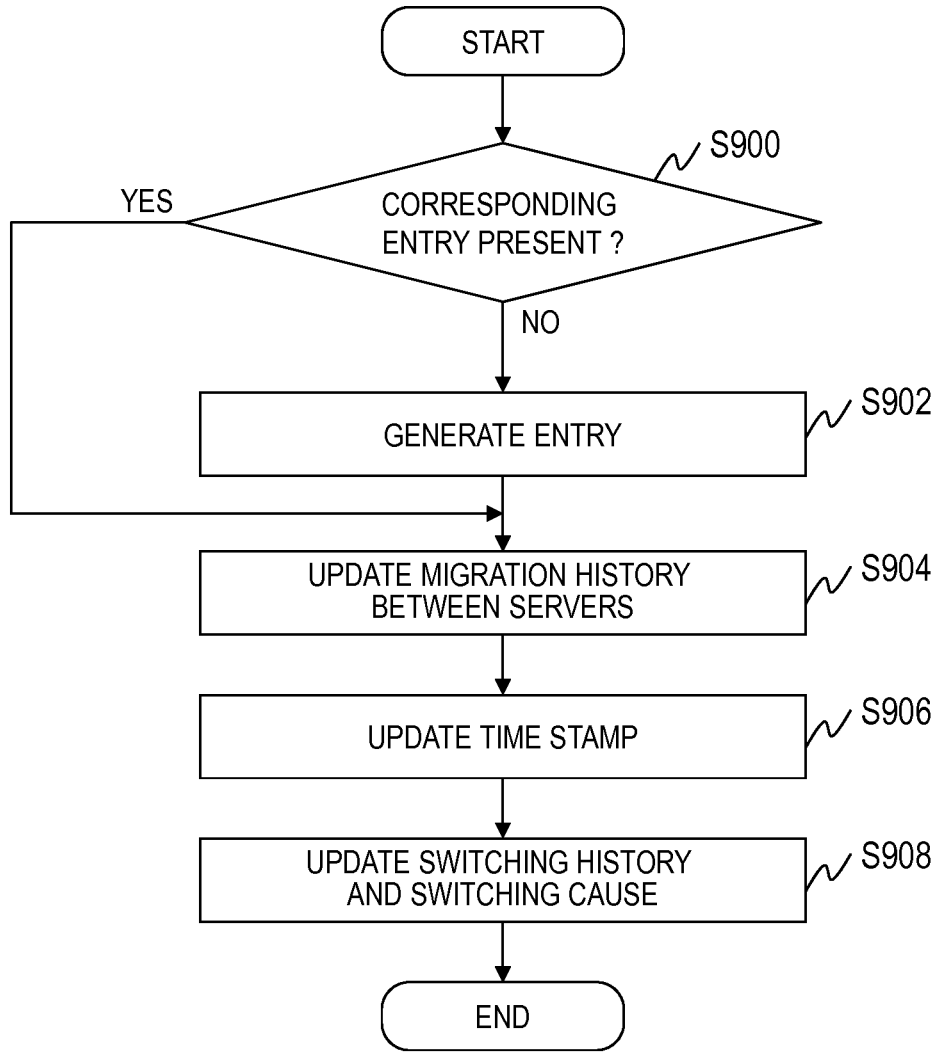
FIG. 18 is a flowchart illustrating a process of updating the migration history executed by the server in the first embodiment of the present invention.

FIG. 18 is a flowchart illustrating the process of updating the migration history 166 executed by the server 100 in the first embodiment of the present invention.

The data relocation processing part 145 obtains identification information (key) of the piece of target data to determine whether an entry of the piece of target data is present in the migration history 166 (step S900). The identification information of the piece of target data can be obtained from the access request.

In a case where it is determined that an entry of the piece of target data is present in the migration history 166, the flow proceeds to step S904.

In a case where it is determined that the entry of the piece of target data is not present in the migration history 166, the data relocation processing part 145 generates an entry in the migration history 166 (step S902). In this case, the data relocation processing part 145 stores the identifier (key) of the piece of target data in the Key 1661 of the generated entry.

The data relocation processing part 145 obtains the identifier of the server 100 specified in step S802 and the identifier of the subject server 100 and stores the identifiers in the migration history 1662 (step S904). Moreover, information is stored so that the order of migration between the servers 100 can be understood. In the example illustrated in FIG. 9, the identifiers of the servers 100 are stored in the order of migration.

The data relocation processing part 145 obtains the time when data was migrated and stores the time in the time stamp 1663 (step S906). As the time when data was migrated, the time when the data relocation processing part 145 obtained the data in step S804 can be used.

Further, the data relocation processing part 145 refers to the switching cause 1642 of the algorithm switching history 164 to specify the cause of switching the distributed algorithm, updates the switching cause 1664, and ends the process (step S908).

Figure 19A:
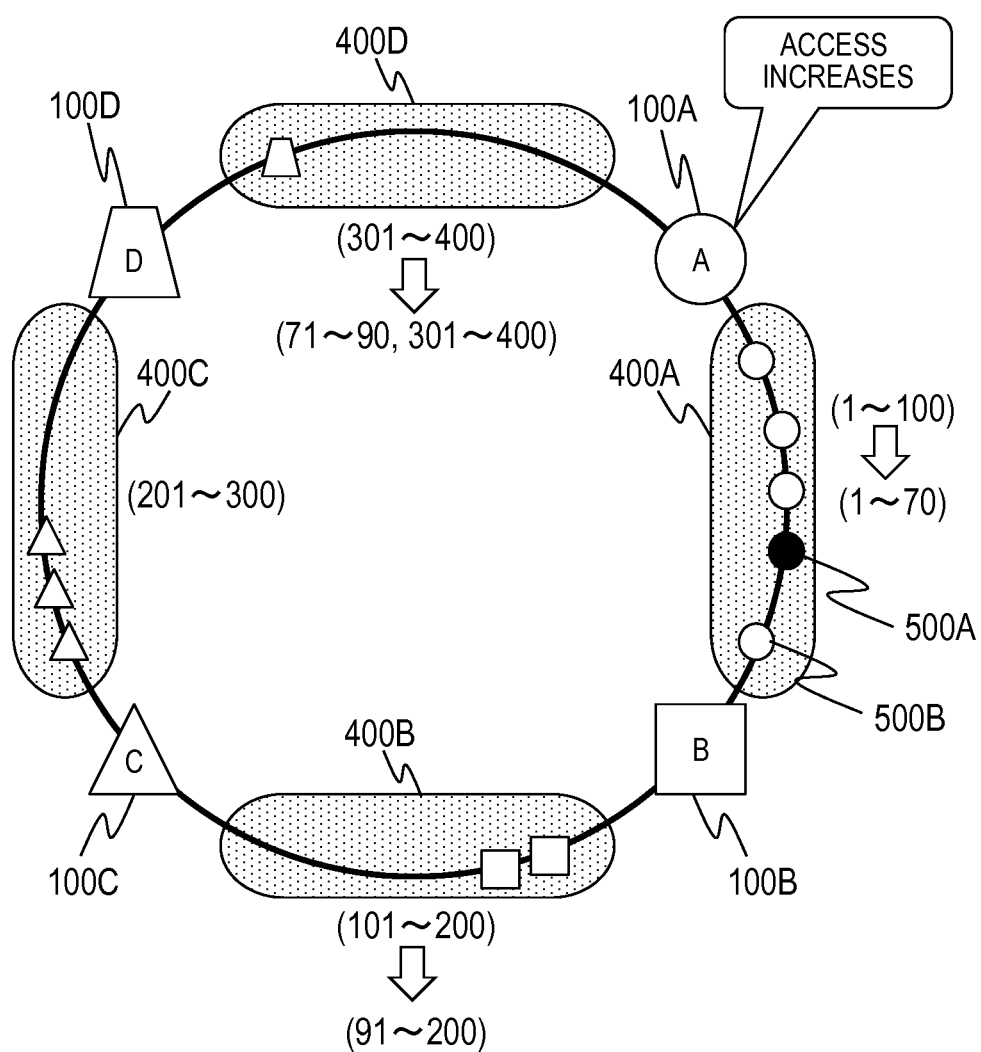
FIGS. 19A and 19B are diagrams illustrating a flow of the processing in the first embodiment of the present invention.
Figure 19B:
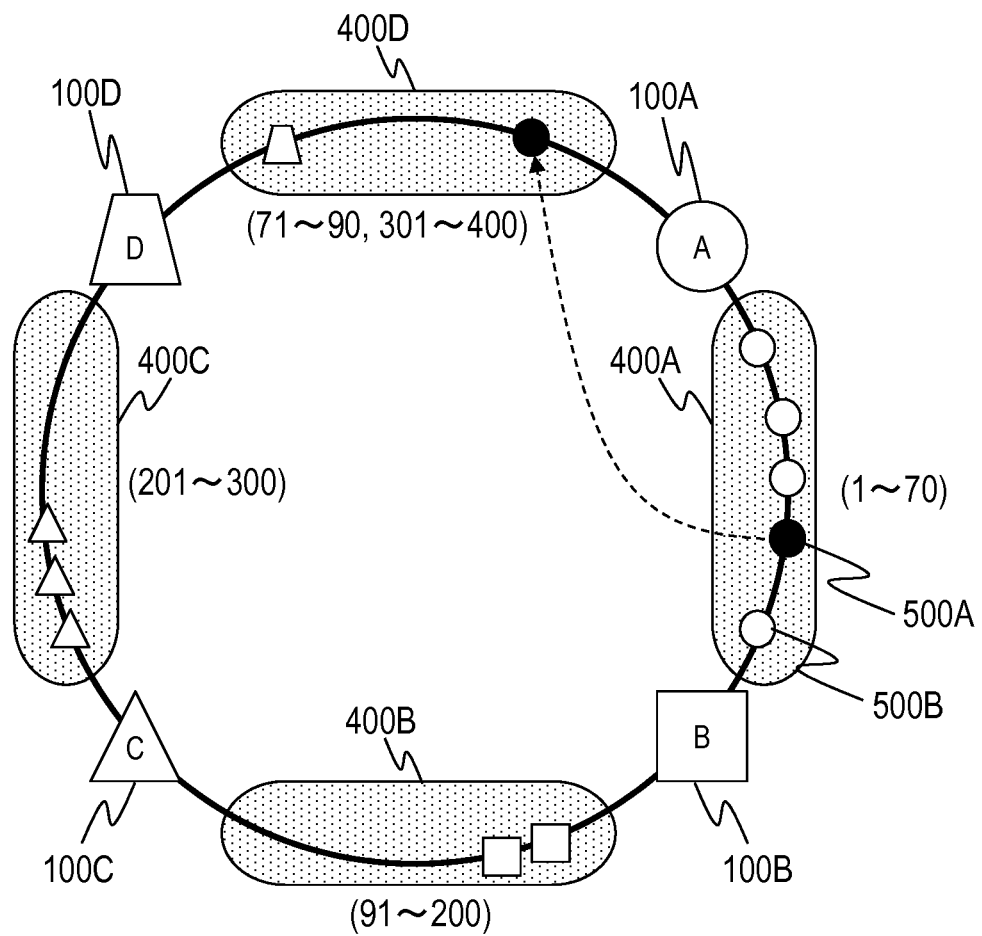

FIGS. 19A and 19B are diagrams illustrating the flow of the processing in the first embodiment of the present invention.

As illustrated in FIG. 19A, in a case where the number of accesses of the server 100A increases, it is determined that it is necessary to switch the distributed algorithm (step S200). In this example, it is assumed that distributed algorithm 1 is switched to distributed algorithm 2.

In the example illustrated in FIG. 19A, due to the switching of the distributed algorithm, the management ranges 400A, 400B, and 400D are changed. That is, the management range 400A is changed to "1" to "80," the management range 400B is changed to "91" to "200," and the management range 400 D is changed to "71 to 90" and "301" to "400." Moreover, data 500A is a piece of data having a hash value of "75," and data 500B is a piece of data having a hash value of "93."

After the distributed algorithm is switched, in a case where the client apparatus 200 accesses the data 500A, the client apparatus 200 transmits an access request to the server 100D that manages the data 500A (step S504).

In a case of receiving the access request from the client apparatus 200, the server 100D determines that the storage destination of the data 500A is the subject server and executes the data relocation process (steps S706 and S708). That is, the server 100D obtains the data 500A from the server 100A and stores the data 500A in the data store 150 (step S804).

On the other hand, as for data 500B, since there is no access request from the client apparatus 200, the data 500B is not relocated in the server 100B. Due to this, it is possible to suppress unnecessary communication between the servers 100 by changing the location of the piece of necessary data only. Therefore, it is possible to reduce the load of the entire system.

Moreover, since the management range 400 is changed with switching of the distributed algorithm, the number of accesses to the server 100A decreases, and the load of the server 100A can be reduced. Therefore, it is possible to reduce the load of the entire system.

The server 100 can generate information for checking the migration state of a piece of data as illustrated in FIG. 20 in response to the request from the client apparatus 200.

FIG. 20 is a diagram illustrating an example of the display of the data migration history in the first embodiment of the present invention.

A data migration history display screen 1000 includes a migration history display region 1010 and a data designation region 1020.

Information on data migration history is displayed in the migration history display region 1010. In the example illustrated in FIG. 20, the information includes a Key 1011, migration history 1012, a time stamp 1013, and a switching cause 1014. Since the Key 1011, the migration history 1012, the time stamp 1013, and the switching cause 1014 are the same as the Key 1661, the migration history 1662, the time stamp 1663, and the switching cause 1664, the description thereof will not be provided.

The information displayed in the migration history display region 1010 is not limited to that illustrated in FIG. 20.

The data designation region 1020 is a region in which information for designating data desired by an administrator operating the client apparatus 200 is input. In the example illustrated in FIG. 20, a predetermined key range is input. Individual keys may be input in the data designation region 1020, and the other information other than the keys, for example, a time stamp, a server identifier, or the like, may be input.

The following process may be performed as a process of displaying the display screen 1000.

The client apparatus 200 operates the data designation region 2020 to transmit a request to display the display screen 2000. The display request includes optional information such as key information, a time stamp, or a server identifier.

The server 100 received the display request generates display information and transmits the display information to the client apparatus 200. As a method of generating the display information, a method may be used in which the server 100 refers to the migration history 166 to generate display information for displaying information desired by the client apparatus 200. In a case where the migration history 166 of the other server 100 is required, the required migration history 166 can be obtained by inquiring the respective servers 100.

In a case of receiving the display information, the client apparatus 200 displays information on the migration history in the migration history display region 1010.

According to the first embodiment, in a case where the load of a specific server 100 has increased, it is possible to reduce the load of each server 100 by switching the distributed algorithm. Moreover, in a case where the load has decreased, the original distributed algorithm may be restored so that a temporal change in the load can be flexibly dealt with. Further, since the data relocated with switching of the distributed algorithm can be restricted to only a piece of necessary data, it is possible to suppress unnecessary communication between the servers 100.

[Second Embodiment]

Figure 21:
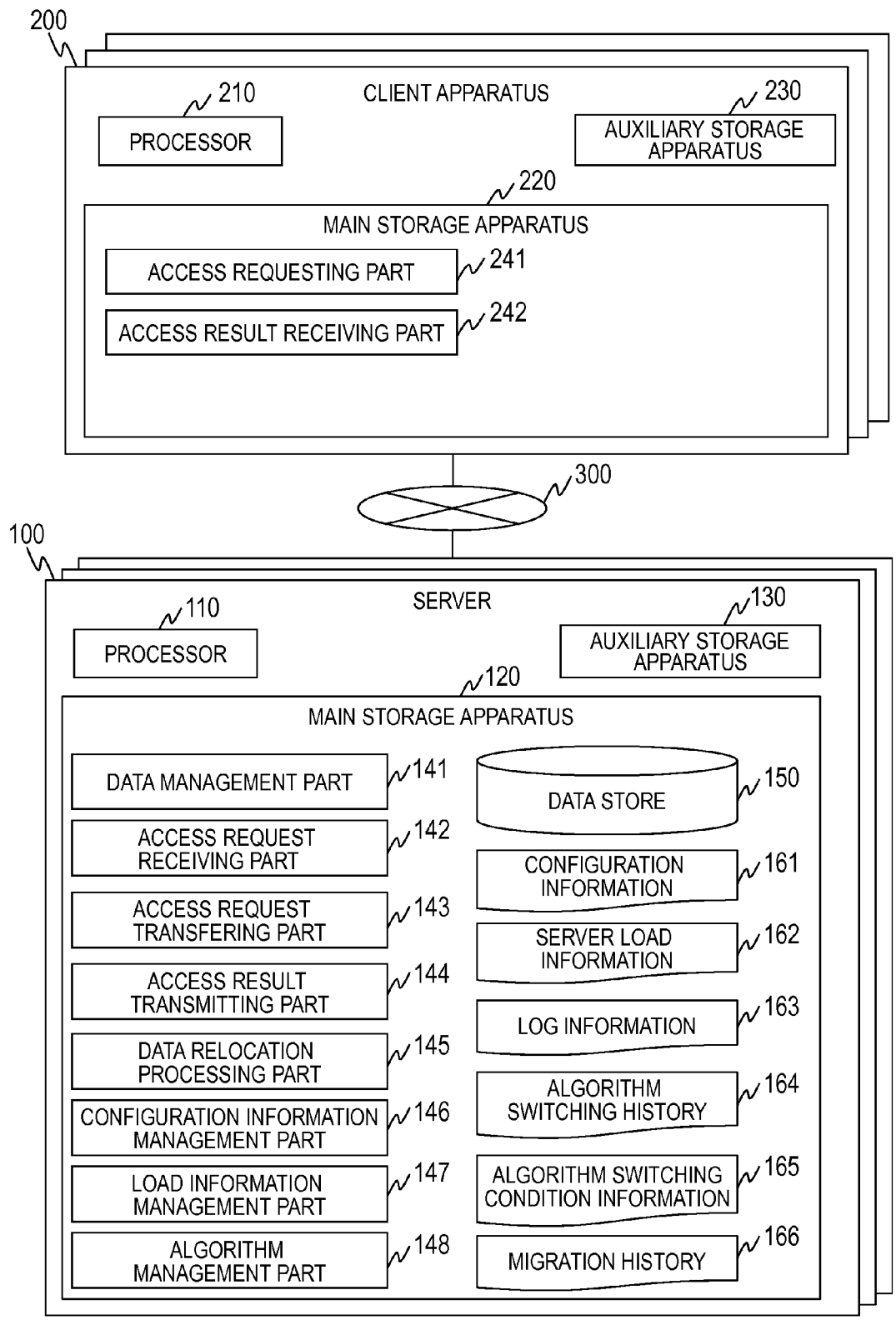
FIG. 21 is a block diagram illustrating the configuration of the computer system according to a second embodiment of the present invention.

FIG. 21 is a block diagram illustrating the configuration of a computer system according to a second embodiment of the present invention. The second embodiment is different from the first embodiment in that the client apparatus 200 does not include the configuration information management part 243 and the configuration information 251.

Thus, the access request issuing process of the second embodiment is different from that of the first embodiment.

Specifically, the process of step S502 is omitted, because the client apparatus 200 does not include the configuration information 251. In this case, the client apparatus 200 transmits an access request to any server 100 coupled to the network 300.

The server 100 received the access request executes the processes illustrated in FIGS. 13 and 16 to transmit the access result.

The other configuration and process are the same as those of the first embodiment, and description thereof will not be provided.

[Third Embodiment]

The third embodiment is different in that the server 100 holds the slave data of the other server 100. Thus, the content of the configuration information 161 in the third embodiment is different. Moreover, the access process and the relocation process of the third embodiment are different. Hereinafter, the third embodiment will be described focusing on the difference from the first embodiment.

Since the configuration of the computer system is the same as that of the first embodiment except for the configuration information 161, the description thereof will not be provided.

FIG. 22 is a diagram illustrating an example of the configuration information 161 in the third embodiment of the present invention.

In the configuration information 161 of the third embodiment, the information stored in the management range 1612 is different. The management range 1612 includes Master 1615, Slave1 1616, and Slave2 1617 as new management items.

The Master 1615 stores the value of the management range 400 of the master data managed by the master server 100. The Slave 1 1616 and Slave2 1617 store the value of the management range 400 of the slave data held by the slave server 100. In the present embodiment, the value of the hash value is stored as the value of the management range 400.

The Slave1 1616 indicates that it is the slave server 100 on the higher level than the Slave2 1617. For example, in a case where a failure occurs in the master server 100 whose the server ID 1611 is "Server 2," the slave server 100 whose the server ID 1611 is "Server 1" continues the process as the master server 100, among the slave servers 100 whose the server ID 1611 is "Server 1" and the slave servers 100 whose the server ID 1611 "Server 4".

In the present embodiment, although a configuration in which the slave data are stored in two slave servers 100 has been illustrated, the present invention is not limited to this. That is, the slave server may be stored in one or three or more slave servers 100.

Next, various processes of the third embodiment will be described.

Since the process of the central server 100 of the third embodiment is the same as that of the first embodiment, the description thereof will not be provided. Since the switching receiving process and the access request receiving process are the same as those of the first embodiment, the description thereof will not be provided. Moreover, since the access request issuing process, the configuration information updating process, and the migration history updating process are the same as those of the first embodiment, the description thereof will not be provided.

In the third embodiment, the switching process, the access process, and the relocation process are different. Hereinafter, the respective processes will be described. In the distributed algorithm switching process, the content of the configuration information 161 updated in step S204 is different.

In step S204, with switching of the distributed algorithm, the management range 400 of the master data and the management range 400 of the slave data are changed. However, the management range 400 of the master data only may be changed. The management range 400 can be changed by appropriately changing the distributed algorithm. In this example, it is assumed that both the management range 400 of the master data and the management range 400 of the slave data are changed.

In a case where the configuration information 161 is changed, the data itself stored in the data store 150 are not changed. This is because a piece of data is not assigned with attribute information or the like indicating whether the piece of data is master data or slave data.

Since the other processes are the same as those of the first embodiment, the description thereof will not be provided.

Figure 23:
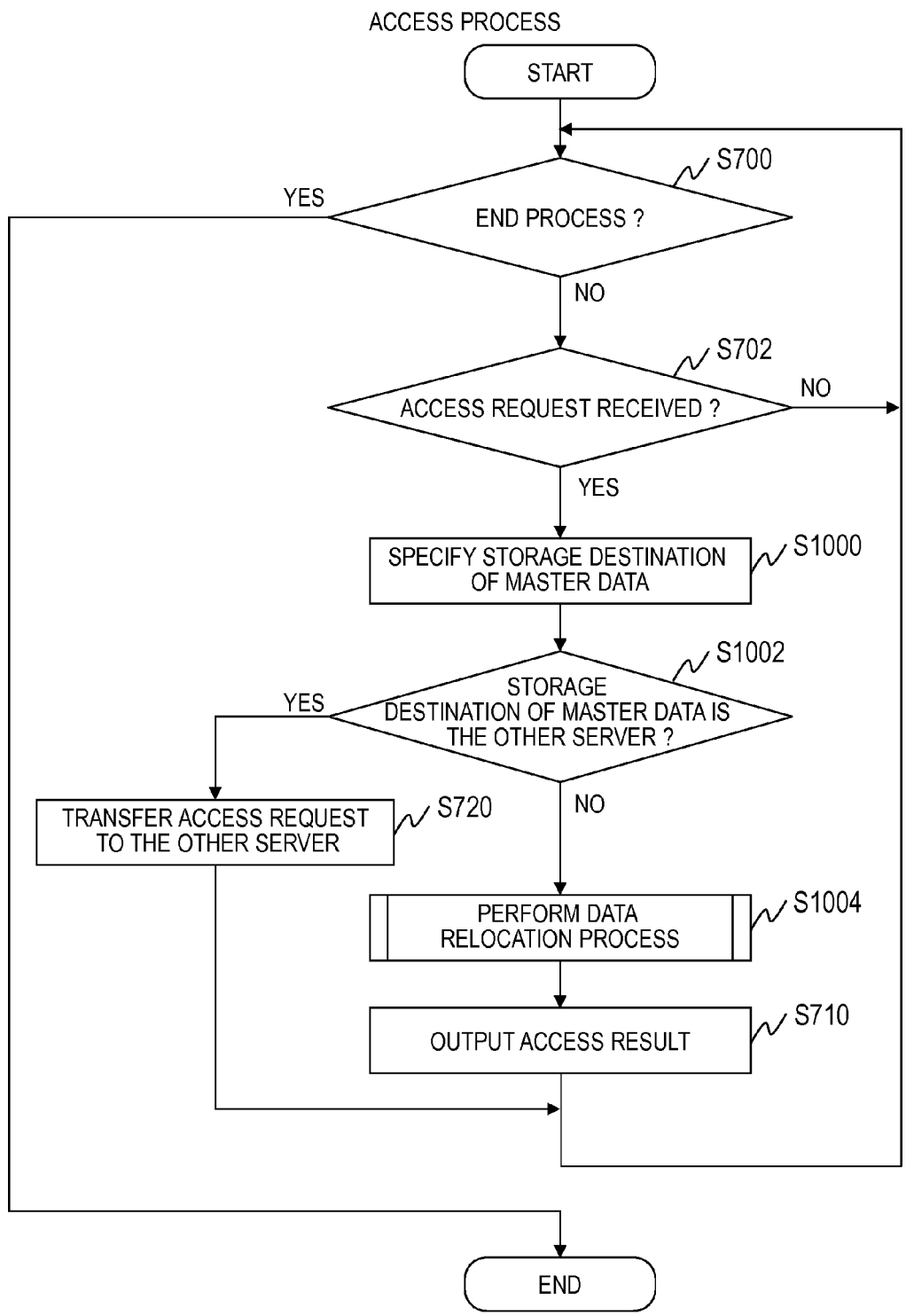
FIG. 23 is a flowchart illustrating the access process executed by the server in the third embodiment of the present invention.

FIG. 23 is a flowchart illustrating the access process executed by the server 100 in the third embodiment of the present invention. The access process is executed by the data management part 141.

Since the processes of steps S700 and S702 are the same as those of the first embodiment, the description thereof will not be provided. Moreover, since the processes of steps S710 and S720 are the same as those of the first embodiment, the description thereof will not be provided.

In a case where the determination result of step S702 is Yes, the data management part 141 specifies a storage destination of master data corresponding to the piece of target data (step S1000). Specifically, the data management part 141 refers to the Master 1615 of the configuration information 161 to determine whether the piece of target data is included in the management range 400 of the master server 100. That is, the master server 100 of the piece of target data is specified.

The data management part 141 determines whether the storage destination of the master data corresponding to the piece of target data is the other server 100 based on the determination result (step S1002).

In the example illustrated in FIG. 4, in a case where the server A receives an access request for a piece of data of which the hash value is "350," since the storage destination of the master data corresponding to the piece of data is the server C, it is determined that the storage destination of the master data corresponding to the piece of target data is the other server 100.

In a case where it is determined that the storage destination of the master data corresponding to the piece of target data is not the other server 100 (that is, the storage destination of the master data corresponding to the piece of target data is the subject server 100), the data management part 141 instructs the data relocation processing part 145 to execute a data relocation process (step S1004). The data relocation process will be described later with reference to FIG. 24.

Figure 24:
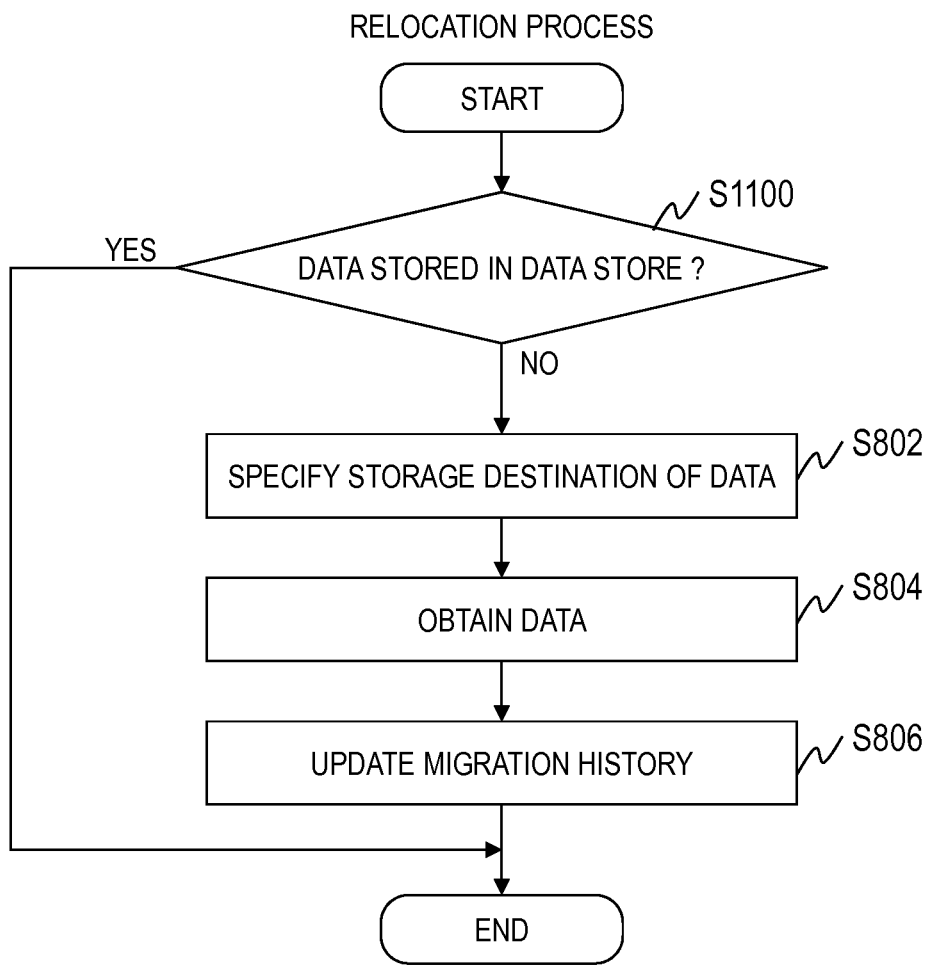
FIG. 24 is a flowchart illustrating the data relocation process executed by the server in the third embodiment of the present invention.

FIG. 24 is a flowchart illustrating the data relocation process executed by the server 100 in the third embodiment of the present invention.

The data relocation processing part 145 determines whether the piece of target data is stored in the data store 150 (step S1100). The third embodiment is different from the first embodiment in that it is determined whether the piece of target data is stored or not by referring to the master data and the slave data stored in the data store 150.

In this manner, in a case where the piece of target data is included in the data managed as the slave data, it is not necessary to obtain the piece of target data and it is possible to suppress communication between the servers 100. In this case, the server 100 manages the piece of target data which is the slave data before switching of the distributed algorithm as the master data.

Since the other processes are the same as those of the first embodiment, the description thereof will not be provided.

[Modification]

Figure 25:
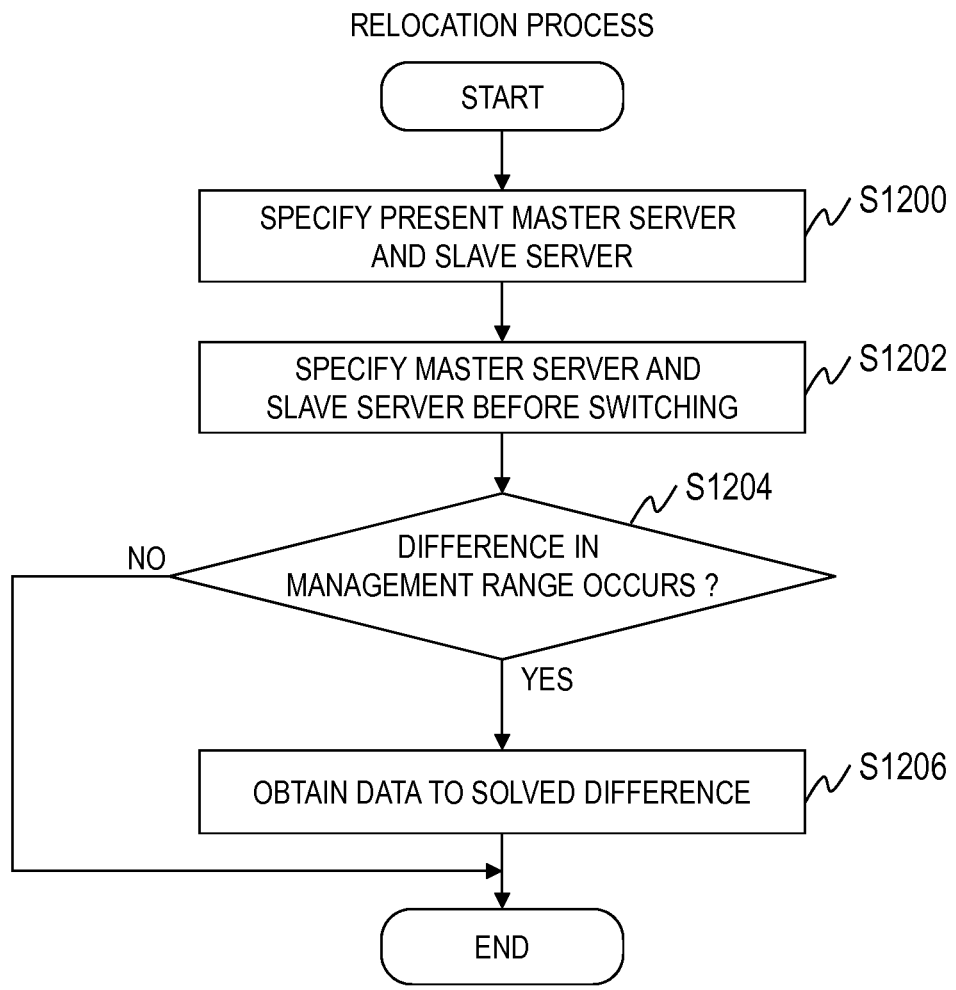
FIG. 25 is a diagram illustrating a modification of the data relocation process executed by the server in the third embodiment of the present invention

FIG. 25 is a diagram illustrating a modification of the data relocation process executed by the server 100 in the third embodiment of the present invention.

The data relocation process illustrated in FIG. 25 is executed after the access request is received or after the distributed algorithm is switched.

The data relocation processing part 145 refers to the configuration information 161 to specify the present management range 400 of each server 100 (step S1200).

The data relocation processing part 145 refers to the algorithm switching history 164 to specify the management range 400 of each server 100 before switching of the distributed algorithm (step S1202). In the following description, the management range 400 before the distributed algorithm is switched will be referred to as a past management range 400.

The data relocation processing part 145 compares the present management range 400 and the past management range 400 to determine whether there is a difference in the management range 400 (step S1204). Here, the difference in the management range 400 will be described by way of an example of the first management range of "1" to "100."

For example, in a case where the first management range before the distributed algorithm is switched is managed by the server 100A as the master server 100 and is managed by the servers 100B and 100C as the slave servers 100, and when the first management range after the distributed algorithm is switched is managed by the server 100B as the master server 100 and is managed by the servers 100C and 100D as the slave servers 100, it is determined that there is a difference in the management range 400. This is because the server 100D needs to obtain data from the other server 100 since the server 100D has not held the data of the first management range before the distributed algorithm is switched.

On the other hand, the servers 100B and 100C do not need to obtain data from the other server 100 since the servers 100B and 100C have held the slave data of the management range 400A and have held the necessary data in a case where the distributed algorithm is switched. In this case, the server 100B manages the data of the first management range as the master data. Moreover, the server 100C manages the data of the first management range as the slave data.

In the above description, although the management range 400 is fixed for the sake of simplicity, the same determination method can be applied even when the management range 400 is different before and after switching of the distributed algorithm.

That is, in a case where the server 100 that needs to obtain data after the distributed algorithm is switched is present, it is determined that there is a difference in the management range 400.

In a case where it is determined that there is no difference in the management range 400, the data relocation processing part 145 ends the process.

In a case where it is determined that there is a difference in the management range 400, the data relocation processing part 145 obtains data so as to obviate the difference (step S1206) and ends the process.

For example, in a case where the master data are not present, the data relocation processing part 145 obtains the master data from the other server 100. In a case where the slave data are not present, the data relocation processing part 145 executes a replication process or the like to obtain the slave data from the other server.

[Fourth Embodiment]

The distributed algorithm switching method of the fourth embodiment is different from that of the first embodiment. Hereinafter, the third embodiment will be described focusing on the difference from the first embodiment.

Figure 26:
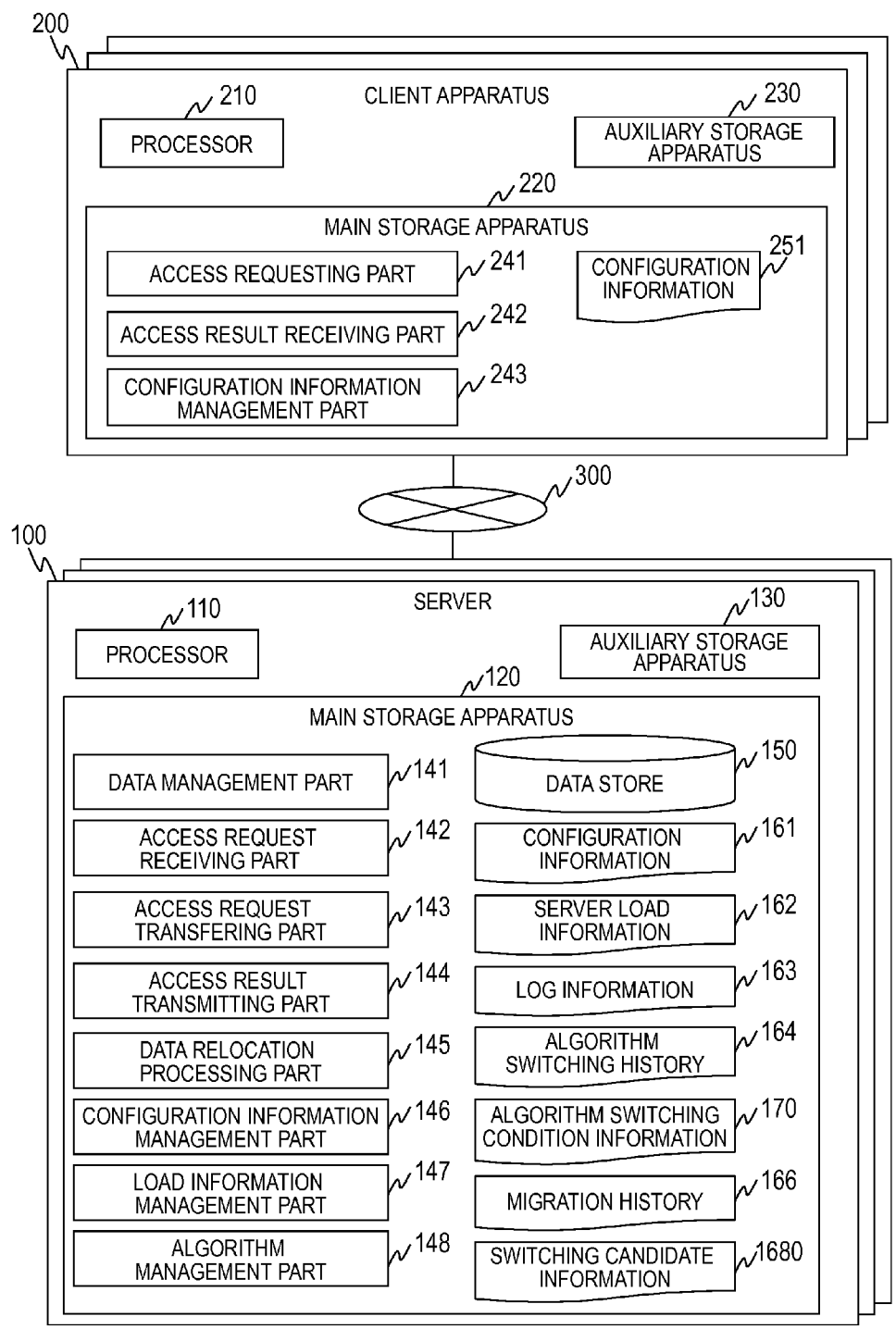
FIG. 26 is a block diagram illustrating the configuration of the computer system according to a fourth embodiment of the present invention.

FIG. 26 is a block diagram illustrating the configuration of a computer system according to the fourth embodiment of the present invention.

In the fourth embodiment, the content of the algorithm switching condition information 170 of the server 100 is different from that of the algorithm switching history 164. Moreover, in the fourth embodiment, switching candidate information 180 is included. The other configurations are the same as those of the first embodiment, and description thereof will not be provided.

FIG. 27 is a diagram illustrating an example of the algorithm switching condition information 170 in the fourth embodiment of the present invention.

The algorithm switching condition information 170 includes load information 1701 and a threshold 1702. The load information 1701 and the threshold 1702 are the same as the load information 1652 and the threshold 1653. As illustrated in FIG. 27, the fourth embodiment is different from the first embodiment in that the switching condition is not associated with the distributed algorithm.

FIG. 28 is a diagram illustrating an example of switching candidate information 180 in the fourth embodiment of the present invention.

The switching candidate information 180 stores information on a switchable distributed algorithm. Specifically, the switching candidate information 180 includes an ID 1801 and a distributed algorithm 1802.

The ID 1801 stores an identifier for identifying the distributed algorithm. The distributed algorithm 1802 stores information on the distributed algorithm. For example, a hash function, a key range, and the like are stored in the distributed algorithm 1802.

Figure 29:
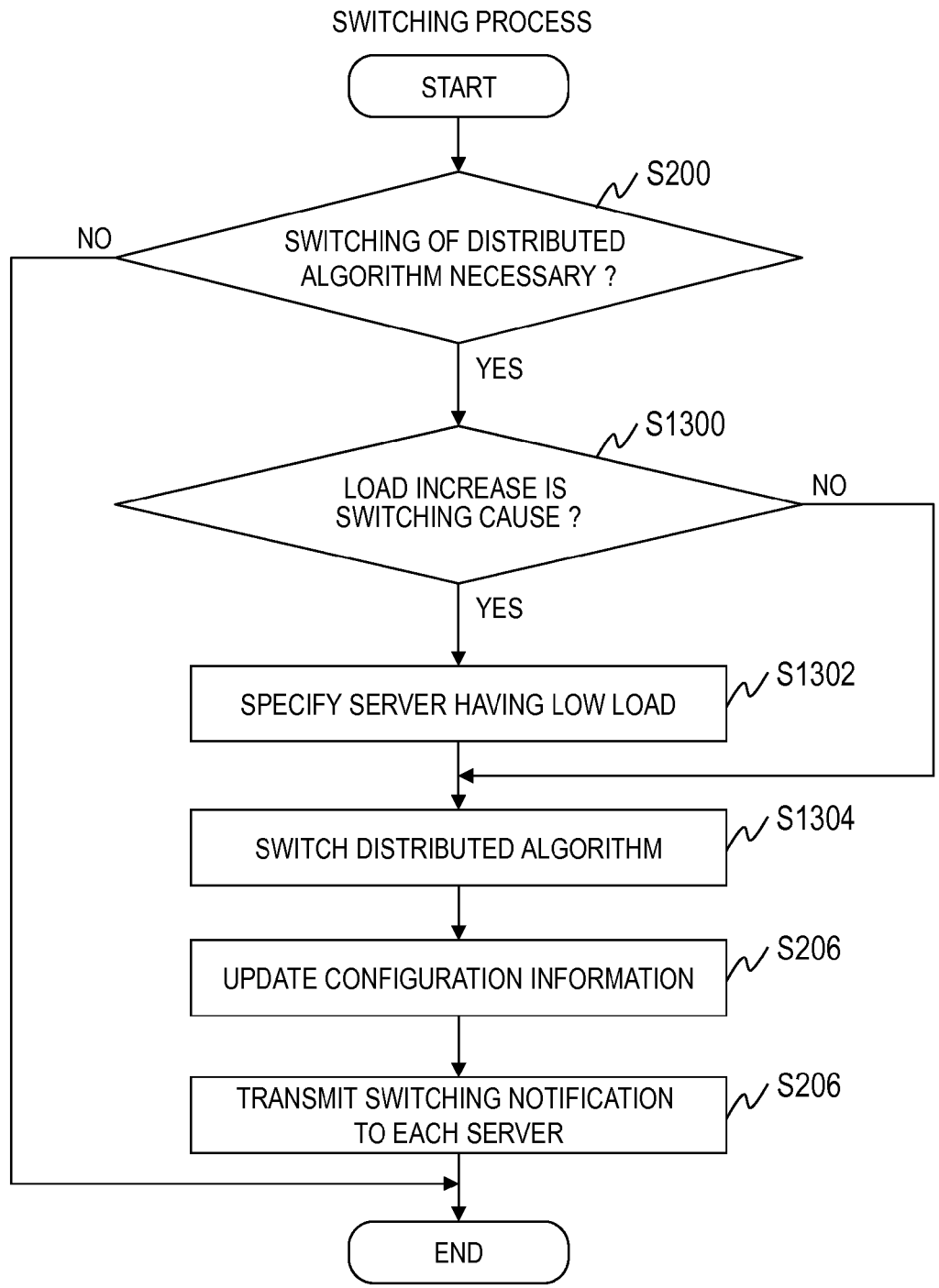
FIG. 29 is a flowchart illustrating the details of the distributed algorithm switching process in the fourth embodiment of the present invention.

FIG. 29 is a flowchart illustrating the details of the distributed algorithm switching process in the fourth embodiment of the present invention.

In a case where it is determined in step S200 that it is necessary to switch the distributed algorithm, the algorithm management part 148 determines whether an increase in the load of the server 100 is a switching cause (step S1300).

Specifically, in the determination process of step S200, it can be determined by checking which switching condition is identical to the distributed algorithm. In step S200, the process is executed based on the algorithm switching condition information 170.

In a case where it is determined that the increase in the load of the server 100 is not the switching cause, the algorithm management part 148 proceeds to step S1304.

In a case where it is determined that the increase in the load of the server 100 is the switching cause, the algorithm management part 148 refers to the server load information 162 to specify the server 100 having a low load and proceeds to step S1304 (step S1302). For example, in a case where the increase in the number of accesses to the server 100 is the switching cause, the algorithm management part 148 refers to the server load information 162 to specify the server 100 having the smallest number of accesses. The number of specified servers 100 does not need to be one, and a plurality of servers may be specified.

The algorithm management part 148 refers to the switching candidate information 180 to select the distributed algorithm and switches the selected distributed algorithm (step S1304). A method of selecting the distributed algorithm is different depending on the switching cause. Hereinafter, the selecting method for each switching cause will be described.

In a case where the switching cause is a decrease in the load of the server 100, the algorithm management part 148 refers to the switching candidate information 180 to select such a distributed algorithm that the loads of the respective servers 100 are equalized. For example, a method of calculating the management range 400 in a case where the distributed algorithm is switched can be used. As another method, the algorithm management part 148 may refer to the algorithm switching history 164 to specify the distributed algorithm before the load of the server 100 is increased.

In a case where the switching cause is an increase in the load of the server 100, the algorithm management part 148 refers to the switching candidate information 180 to specify a distributed algorithm for allocating the data of the management range 400 of the server 100 in which the load has increased, to the server 100 in which the load is small. For example, a method of calculating the management range 400 in a case where the distributed algorithm is switched can be used. The algorithm management part 148 selects a distributed algorithm that can best equalize the load among the specified distributed algorithms.

This is the process of step S1304.

Since the processes of steps S204 and S206 are the same as those of the first embodiment, the description thereof will not be provided.

As described above, according to the present invention, in a case where the load of a specific server 100 has increased, it is possible to reduce the load of each server 100 by switching the distributed algorithm. Moreover, since the data relocated with switching of the distributed algorithm can be restricted to only a piece of necessary data, it is possible to suppress unnecessary communication between the servers 100. Therefore, it is possible to suppress a processing cost and to realize dynamic distributed algorithm switching.

Various types of software illustrated in the present embodiment can be stored in various electromagnetic, electronic, and optical recording media and can be downloaded to a computer via a communication network such as the Internet.

Further, in the present embodiment, although an example of using software-based control has been described, part of the control may be realized by hardware.

While the present invention has been described in detail with reference to the accompanying drawings, the present invention is not limited to the specific configuration, and various changes and equivalents can be made within the scope of the claims.

What is claimed is:

1. A computer system comprising a plurality of computers coupled through a network, the computer system performing service by using a database constructed by a storage area of each of the plurality of computers, wherein
   each of the plurality of computers includes a processor, a memory coupled to the processor, and a network interface for communicating with another computer via the network which is coupled to the processor, and
   a plurality of pieces of data are located in the plurality of computers constructing the database based on a distributed algorithm for distributing and locating the plurality of pieces of data in the plurality of computers, the plurality of pieces of data including a key and a data value are stored in the database, and the distributed algorithm is an algorithm for determining a management range which is a range of the key,
wherein the computer system comprises:
a load information management part to manage load information on a load of each of the plurality of computers constructing the database;
an algorithm management part to switch the distributed algorithm of the computer system based on the load information; and
a relocation processing part to relocate data stored in each of the plurality of computers based on the switched distributed algorithm,
wherein the relocation processing part is configured to:
determine whether a piece of first data is included in the management range of a first computer based on the switched distributed algorithm, in a case where the first computer receives an access request for the piece of first data after the distributed algorithm is switched,
determine whether the piece of first data is stored in the first computer, in a case where it is determined that the piece of first data is included in the management range of the first computer, and
obtain the piece of first data from the other computer which stores the piece of first data, in a case where it is determined that the piece of first data is not stored in the first computer, and
the algorithm management part is configured to switch the distributed algorithm, in a case where a load of a computer constructing the database is equal to or larger than a predetermined threshold, or in a case where the load of the computer constituting the database equal to or smaller than a predetermined threshold.

2. The computer system according to claim 1, wherein the algorithm management part is configured to switch a second distributed algorithm to a first distributed algorithm, after it is determined that the load of the computer constructing the database is equal to or larger than the predetermined threshold so that the first distributed algorithm is switched to the second distributed algorithm, in a case where it is determined that the load of the computer constructing the database is equal to or smaller than the predetermined threshold.

3. The computer system according to claim 2, wherein the load of the computer constructing the database is one of the number of accesses to the computer and the usage of the memory of the computer.

4. The computer system according to claim 1, wherein the relocation processing part is configured to:
obtain a piece of copy of data of the piece of first data, and
relocate data by storing the obtained piece of copy of data of the piece of first data in the first computer.

5. The computer system according to claim 1, wherein the relocation processing part is configured to:
obtain the piece of first data,
store the obtained piece of first data in the first computer, and
relocate data by deleting the piece of first data from the other computer which stores the piece of first data.

6. The computer system according to claim 1, wherein the management range includes a first management range which is the range of data managed by the computer and a second management range which is the range of copy of data of data managed by the other computer, the computer constructing the database stores the data included in the first management range and the copy of data included in the second management range,
the relocation processing part is configured to:
determine whether the first computer holds the piece of copy of data of the piece of first data, and
relocate the piece of first data in the first computer in a case where it is determined that the first computer does not hold the piece of copy of data of the piece of first data.

7. The computer system according to claim 1, wherein the algorithm management part is configured to:
specify a computer having a low load among the plurality of computers constructing the database,
select the distributed algorithm so that the specified computer is a destination of the data, and
switch the distributed algorithm to the selected distributed algorithm.

8. The computer system according to claim 1, wherein the relocation processing part is configured to generate history display information including an identifier of the relocated data, an identifier of the computer in which the data has been stored before the relocation, an identifier of the computer in which the data is stored after the relocation, and the time when the piece of data was relocated.

9. A data management method in a computer system including a plurality of computers coupled through a network, the computer system performs a service by using a database constructed by a storage area of each of the plurality of computers, wherein
each of the computers includes a processor, a memory coupled to the processor, and a network interface for communicating with the another computer via the network coupled to the processor, and
a plurality of pieces of data are located in the plurality of computers constructing the database based on a distributed algorithm for distributing and locating the plurality of pieces of data in the plurality of computer, the plurality of pieces of data including a key and a data value are stored in the database, and the distributed algorithm is an algorithm for determining a management range which is a range of the key,
wherein the method includes:
a first step of obtaining, by the computer, load information on a load of each of the computers constructing the database;
a second step of switching, by the computer, the distributed algorithm of the computer system based on the obtained load information; and
a third step includes:
relocating, by the computer, the plurality of pieces of data stored in each of the plurality of computers based on the distributed algorithm switched;
determining whether a piece of first data is included in the management range of a first computer based on the switched distributed algorithm, in a case where a first computer receives an access request for the piece of first data after the distributed algorithm is switched;
determining whether the piece of first data is stored in the first computer, in a case where it is determined that the piece of first data is included in the management range of the first computer;
obtaining the piece of first data from the other computer which stores the piece of first data, in a case where the piece of first data is not stored in the first computer; and
switching the distributed algorithm, in a case where a load of a computer constructing the database is equal to or larger than a predetermined threshold, or in a case where the load of the computer constructing the database equal to or smaller than a predetermined threshold.

10. The data management method according to claim 9, further including:
a step of switching, by the computer, a second distributed algorithm to a first distributed algorithm, after it is determined that the load of the computer constructing the database is equal to or larger than the predetermined threshold so that the first distributed algorithm is switched to the second distributed algorithm, in a case where it is determined that the load of the computer constructing the database is equal to or smaller than the predetermined threshold.

11. The data management method according to claim 10, wherein
the load of the computer constructing the database is one of the number of accesses to the computer and the usage of the memory of the computer.

12. The data management method according to claim 9, wherein
the third step includes:
a step of obtaining a piece of copy of data of the piece of first data; and
a step of storing the obtained piece of copy of data of the piece of first data in the first computer.

13. The data management method according to claim 9, wherein
the third step includes:
a step of obtaining the piece of first data;
a step of storing the obtained piece of first data in the first computer; and
a step of deleting the piece of first data from the other computer which stores the piece of first data.

14. The data management method according to claim 9, wherein
the management range includes a first management range which is the range of data managed by the computer and a second management range which is the range of copy data of data managed by the other computer,
the computer constructing the database stores the data included in the first management range and the copy of data included in the management range, and
the third step includes:
a step of determining whether the first computer holds the piece of copy of data of the piece of first data; and
a step of relocating the piece of first data in the first computer, in a case where it is determined that the first computer does not hold the piece of copy of data of the piece of first data.

15. The data management method according to claim 9, wherein
the second step includes the steps of:
a step of specifying a computer having a low load among the plurality of computers constructing the database,
a step of selecting the distributed algorithm so that the specified computer is a destination of data, and
a step of switching the distributed algorithm to the selected distributed algorithm.

16. A non-transitory computer-readable storage medium storing a program executed by a computer included in a computer system,
wherein the computer system includes a plurality of computers is coupled through a network, wherein the computer system performs a service by using a database constructed by a storage area of each of the plurality of computers, wherein each of the computers includes a processor, a memory coupled to the processor, and a network interface for communicating with the another computer via the network which is coupled to the processor, and wherein a plurality of pieces of data are located in the plurality of computers constructing the database based on a distributed algorithm for distributing and locating the plurality of pieces of data in the plurality of computers, the plurality of pieces of data including a key and a data value are stored in the database, and the distributed algorithm is an algorithm for determining a management range which is a range of the key, wherein the program causing the computer to execute:

a procedure of obtaining load information on a load of each of the plurality of computers constructing the database;

a procedure of switching the distributed algorithm of the computer system based on the obtained load information;

a procedure of relocating the plurality of pieces of data stored in each of the plurality of computers based on the distributed algorithm switched;

a procedure of determining whether a piece of first data is included in the management range of a first computer based on the switched distributed algorithm, in a case where a first computer receives an access request for the piece of first data after the distributed algorithm is switched;

a procedure of determining whether the piece of first data is stored in the first computer, in a case where it is determined that the piece of first data is included in the management range of the first computer;

a procedure of obtaining the piece of first data from the other computer which stores the piece of first data, in a case where the piece of first data is not stored in the first computer; and a procedure of switching the distributed algorithm, in a case where a load of a computer constructing the database is equal to or larger than a predetermined threshold, or in a case where the load of the computer constructing the database equal to or smaller than a predetermined threshold.

* * * * *